(12) United States Patent
Fahimi et al.

(10) Patent No.: US 12,057,746 B2
(45) Date of Patent: Aug. 6, 2024

(54) HIGH TORQUE DENSITY DOUBLE STATOR PERMANENT MAGNET ELECTRIC MACHINE

(71) Applicant: Board of Regents, The University of Texas System, Austin, TX (US)

(72) Inventors: Babak Fahimi, Plano, TX (US); Amir Parsapour, Plano, TX (US); Mehdi Moallem, Plano, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 594 days.

(21) Appl. No.: 17/301,591

(22) Filed: Apr. 8, 2021

(65) Prior Publication Data

US 2021/0320574 A1 Oct. 14, 2021

Related U.S. Application Data

(60) Provisional application No. 63/007,120, filed on Apr. 8, 2020.

(51) Int. Cl.
*H02K 16/04* (2006.01)
*H02K 1/27* (2022.01)

(52) U.S. Cl.
CPC .............. *H02K 16/04* (2013.01); *H02K 1/27* (2013.01); *H02K 2201/03* (2013.01); *H02K 2213/03* (2013.01)

(58) Field of Classification Search
CPC ...... H02K 16/04; H02K 1/27; H02K 2201/03; H02K 2213/03
See application file for complete search history.

(56) References Cited

U.S. PATENT DOCUMENTS 6,459,185 B1 * 10/2002 Ehrhart .................. H02K 5/203
310/156.45
9,231,457 B2 1/2016 Abbasian et al.
(Continued)

FOREIGN PATENT DOCUMENTS

CN 106602823 A * 4/2017 ............. H02K 1/146

OTHER PUBLICATIONS

Parsapour, et al. (May 2019) "High Torque Density Double Stator Permanent Magnet Electric Machine" IEEE International Electric Machines & Drives Conference (IEMDC).

*Primary Examiner* — Thomas Truong
(74) *Attorney, Agent, or Firm* — Schultz & Associates, P.C.

(57) ABSTRACT

A novel high torque density double stator permanent magnet electric machine is provided. An outer stator is provided which has complex teeth and optionally can have windings every tooth or every other tooth. A rotor is provided having a plurality of magnet receivers, each with a complex topology. Magnets are provided in the rotor which are tangentially magnetized with alternating polarities and a complex topology to increase torque density. An inner stator is provided having a plurality of teeth with complex topologies. Windings are provided around every tooth or every other tooth, alternatively. Air-gaps are provided between the outer stator and the rotor and between the rotor and inner stator. The air-gap between the inner stator and the rotor is smaller than the air-gap between the outer stator and the rotor. A lower current density in certain windings improves thermal response without comprising average torque.

22 Claims, 26 Drawing Sheets

(56) References Cited

U.S. PATENT DOCUMENTS

| | | |
|---|---|---|
| 10,033,233 B2 | 7/2018 | Fahimi et al. |
| 10,312,182 B2 | 6/2019 | Fahimi et al. |
| 2006/0214526 A1* | 9/2006 | Morita .................. H02K 16/04 310/156.01 |
| 2008/0169720 A1* | 7/2008 | Petek .................... H02K 16/04 310/184 |
| 2011/0204736 A1* | 8/2011 | Lisi ....................... H02K 16/04 310/126 |
| 2015/0002063 A1* | 1/2015 | Fahimi .................. H02K 21/22 318/400.41 |
| 2016/0013689 A1* | 1/2016 | Ichien ................... H02K 1/2773 310/156.38 |
| 2017/0019005 A1* | 1/2017 | Tojima ................ H02P 25/0925 |
| 2019/0229666 A1* | 7/2019 | Zhou .................... H02K 41/033 |

\* cited by examiner

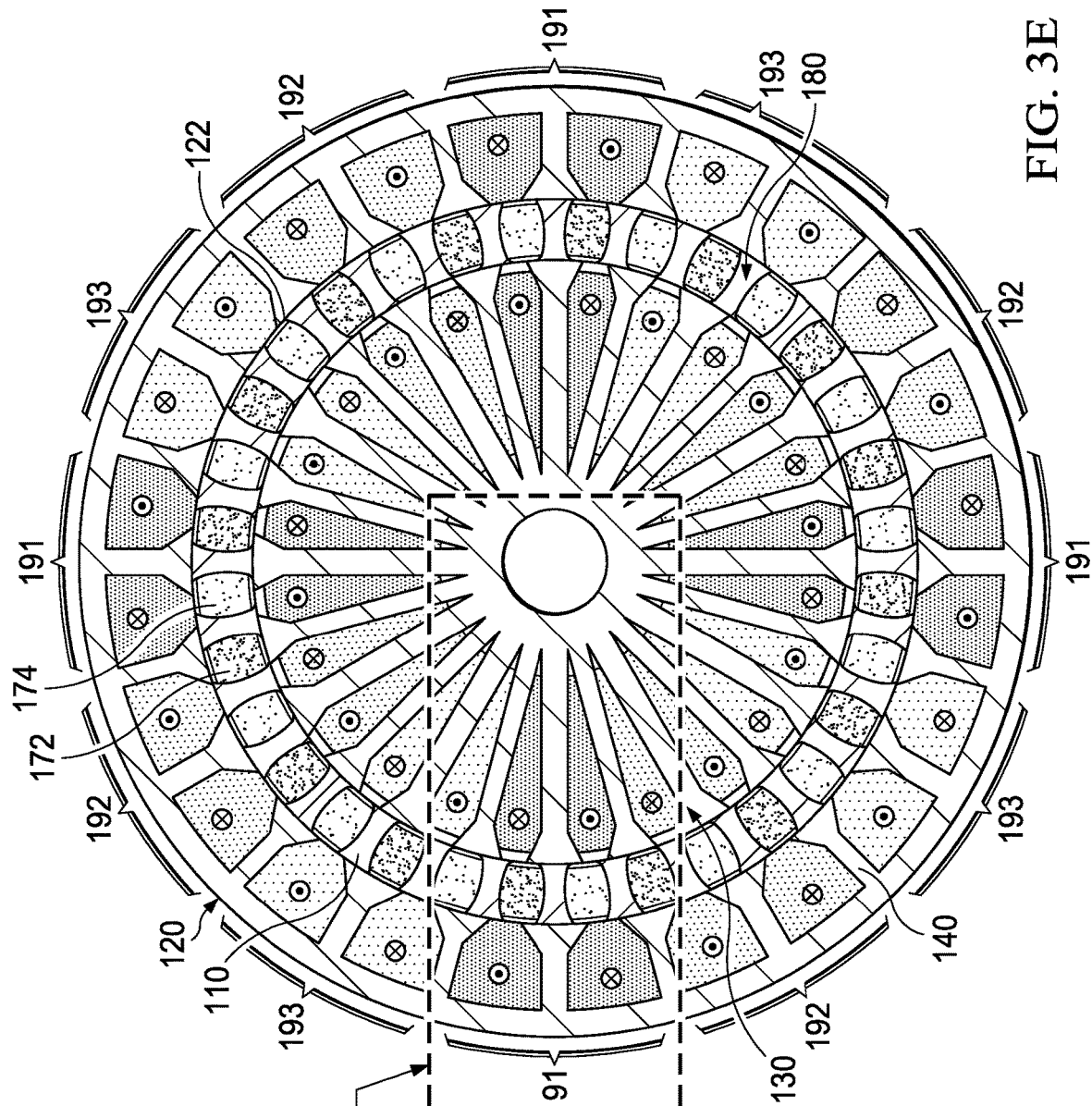

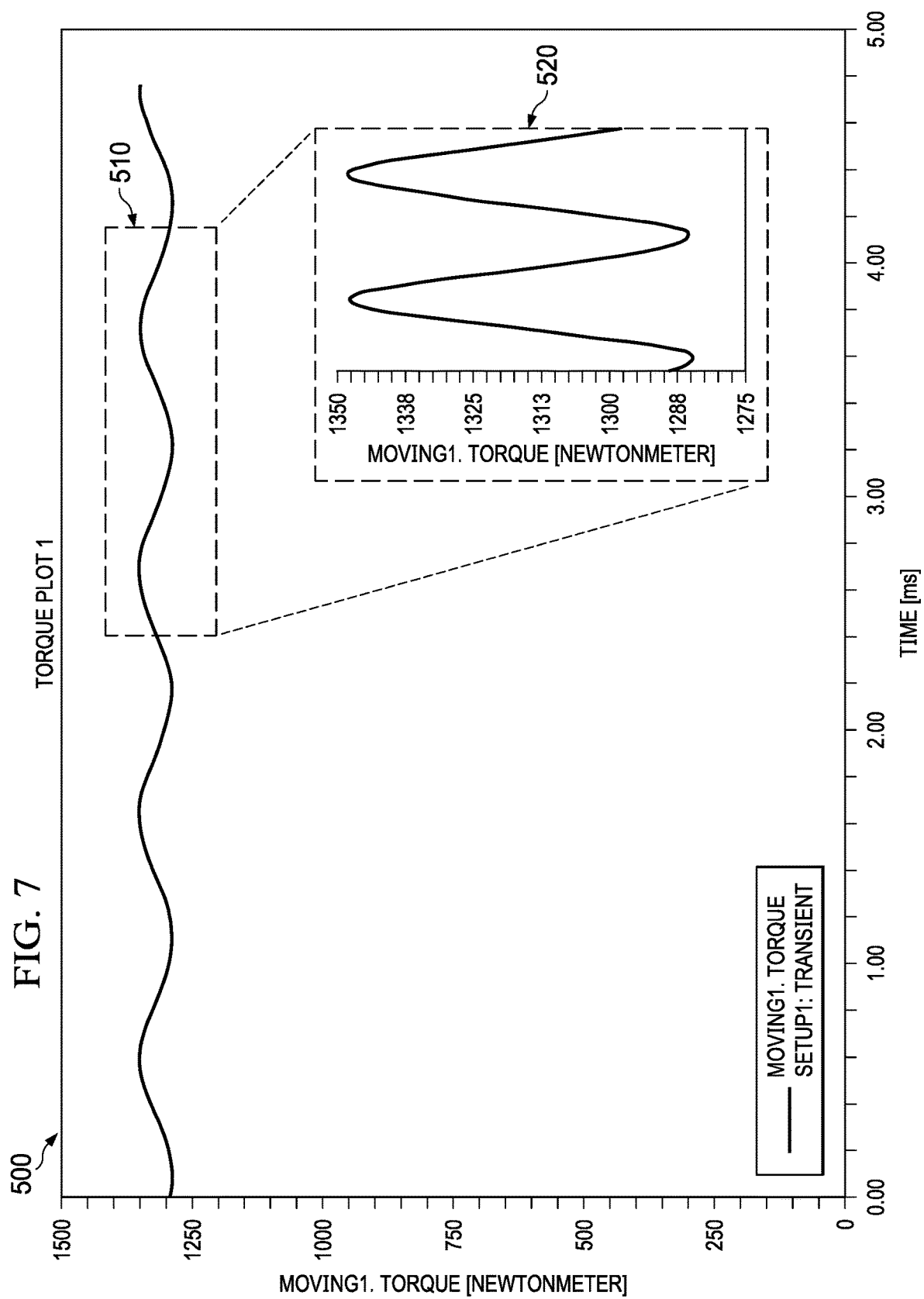

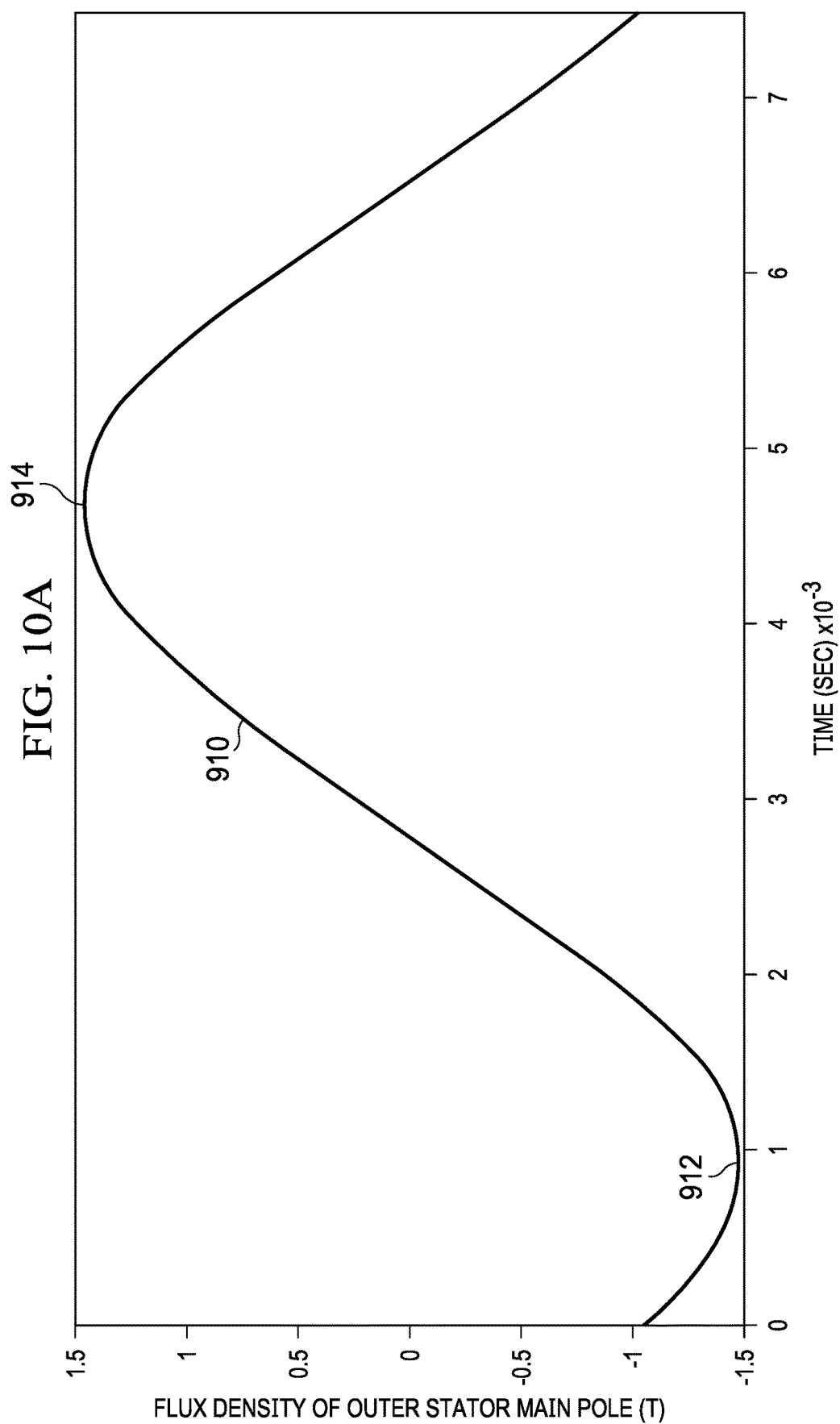

HIGH TORQUE DENSITY DOUBLE STATOR PERMANENT MAGNET ELECTRIC MACHINE

CROSS-REFERENCE TO RELATED APPLICATIONS

This application claims priority benefit from U.S. Provisional Application No. 63/007,120 filed Apr. 8, 2020. The patent application identified above is incorporated here by reference in their entirety to provide continuity of disclosure.

FIELD OF THE INVENTION

The present invention relates to high torque density electric machines. More particularly, the invention relates to high torque density double stator permanent magnet electric machines.

BACKGROUND OF THE INVENTION

High torque density electric machines are well suited for use in various high-value applications such as electric vehicles, robotics and biomedical devices. Although exterior rotor electric machines and axial flux electric machines can produce higher torque density compared to interior rotor electric machines, they are not as structurally rigid as interior rotor electric machines. Therefore, in applications where high structural rigidity is required exterior rotor electric machines and axial flux electric machines are not suitable.

Double stator electric machines utilize available space every effectively for placement of windings and generate high torque density. In addition, double stator electric machines present a structure that is highly rigid. Consequently, double stator electric machines are suitable for high torque density applications in which rigidity is necessary.

U.S. Pat. No. 9,231,457 to Abbasian, et al. discloses a double stator switched reluctance apparatus. Abbasian describes an inner stator having a plurality of poles, a rotor disposed radially outward of the inner stator and having a plurality of segments serving as poles, and an outer stator disposed radially outward of the rotor and having a plurality of poles.

However, a significant drawback of double stator electric machines is undesired heat generation. In practice, the inner stator quickly becomes significantly hotter than the outer stator. This is because the inner stator is isolated within the rotor away from convection with ambient air. Heat build-up within the inner rotor may severely damage the machine. Therefore, what is needed is a double stator electric machine that controls heat generation while maintaining high torque density.

Rare-earth permanent magnets are widely used in high torque density electric machines. The prior art adopts one of two design configurations, namely, the radial configuration and the spoke configuration. In the radial configuration, permanent magnets are arranged on the rotor with their magnetic dipoles radially orientated. In the spoke configuration, permanent magnets are arranged on the rotor with their magnetic dipoles tangentially orientated. Spoke type configurations generate high torque density. However, a significant drawback of the spoke type configuration is pronounced demagnetization of the magnets. Demagnetization quickly results in degraded performance of the machine.

Therefore, what is also needed is a machine which maintains high torque density while avoiding demagnetization.

SUMMARY OF THE INVENTION

An embodiment of the invention comprises a high torque density double stator permanent magnet electric machine having an inner stator, a rotor and an outer stator where the rotor has a plurality of permanent magnets and a plurality of rotor segments located between the permanent magnets, where the inner stator, the rotor and the outer stator are coaxial, each of the plurality of permanent magnets is tangentially magnetized with respect to the rotor axis, and the magnetic polarity of each of the plurality of permanents magnets alternates. Optionally, both the inner stator windings and outer stator windings can be wound around every other tooth of the stators to eliminate mutual inductance, decouple energizing phases and provide fault tolerance. Alternatively, both the inner stator windings and the outer stator windings can be wound around every tooth of the stators when fault tolerance is not required. In either case, the invention advantageously generates a flux distribution within the electric machine that produces an efficient distribution of forces and a high torque density.

Another embodiment of the invention comprises a high torque density double stator permanent magnet electric machine having an inner stator, a rotor and an outer stator where there is a reduced air-gap between the inner stator and the rotor as compared to a larger air-gap between the outer stator and the rotor. This embodiment demonstrates a lower current density in the windings of the inner stator compared to a higher current density in the windings of the outer stator. This embodiment also advantageously lowers the temperature of the inner rotor compared to the temperature of the outer stator while maintaining high torque density.

Another embodiment of the invention comprises a high torque density double stator permanent magnet electric machine having a rotor with a plurality of tangentially magnetized permanent magnets coupled to a plurality of rotor segments located between the permanent magnets. To prevent demagnetization on the corners of the permanent magnets, the shapes of both the magnet segments and the rotor segments include complex topology profiles that include complimentary convex and concave sections. These new magnet shapes resist demagnetization but maintain high torque density, rigid structure, and advantageous thermal management of the inner stator.

In this embodiment each of the plurality of tangentially magnetized permanent magnets has a first convex surface on a first tangential side and a second convex surface on a second tangential side that is opposite the first tangential side, and where each of the plurality of rotor segments has a first bidirectional tapered flange on an inner radial side, a second bidirectional tapered flange on an outer radial side that is opposite the inner radial side, a first concave surface on a first tangential side and a second concave surface on a second tangential side that is opposite the first tangential side. This embodiment advantageously prevents demagnetization of the permanent magnets while maintaining high torque density.

Embodiments of the invention are suitable for applications where both high torque density and high-power density are required, such as where space is limited. Embodiments of the invention are particularly useful for electric vehicles, biomedical devices, robotics, wind turbine generators, aerospace and micro-mobility very light vehicles such as electric scooters, electric skateboards, and pedal electric bicycles.

BRIEF DESCRIPTION OF THE DRAWINGS

FIG. 3E is a cross-section of a preferred embodiment of an assembled machine.

FIG. 7 is a graph of torque versus time for a machine of a preferred embodiment.

FIG. 10A is a graph of flux density versus time at an outer stator main pole of a machine of a preferred embodiment.

DETAILED DESCRIPTION OF THE INVENTION

In the description that follows, like parts are marked throughout the specification and figures with the same numerals, respectively. The figures are not necessarily drawn to scale and may be shown in exaggerated or generalized form in the interest of clarity and conciseness.

Figure 1A:
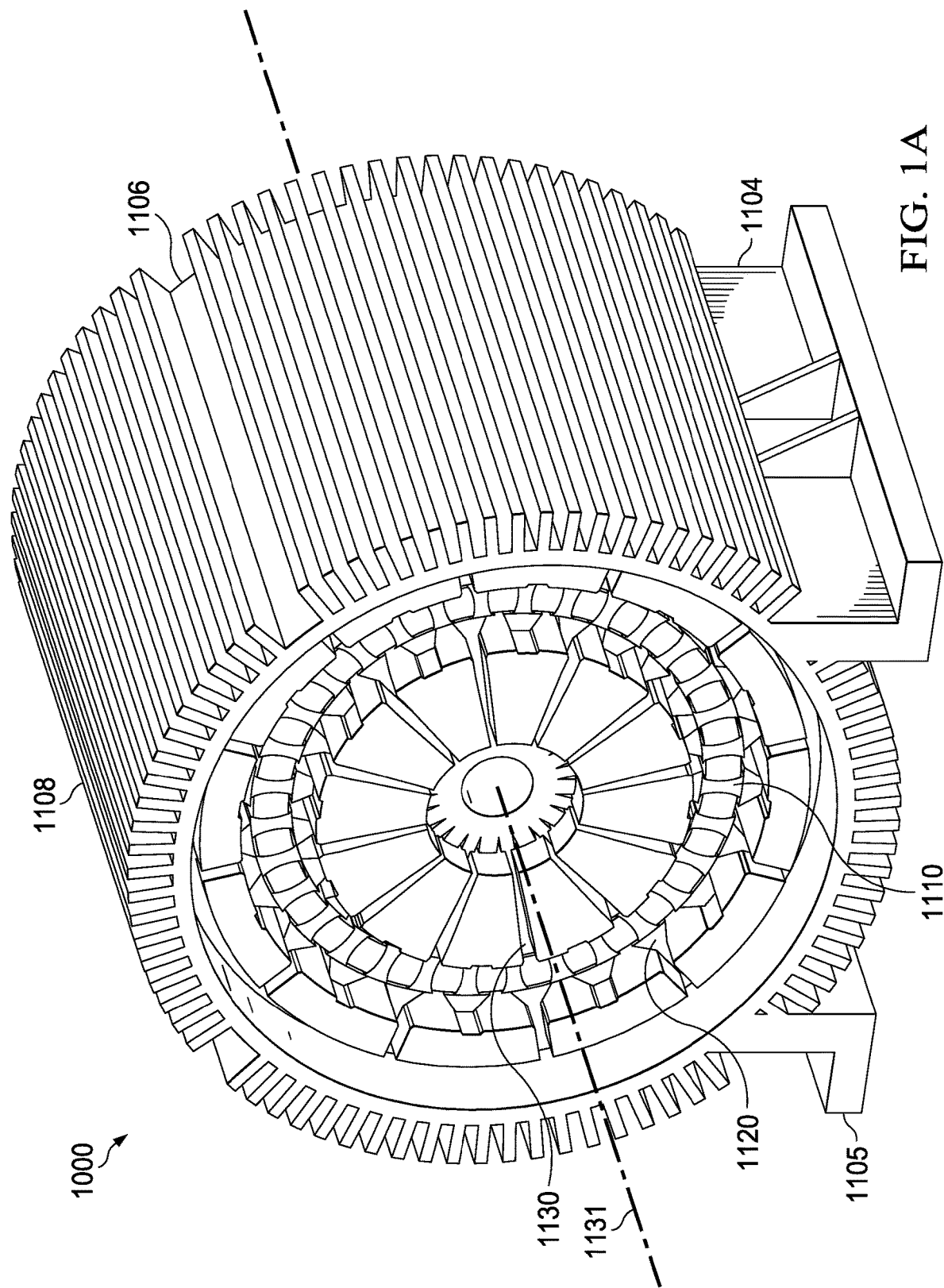
FIG. 1A is a isometric diagram of a preferred embodiment of a high torque density double stator permanent magnet electric machine.

FIG. 1A shows an isometric view of high torque density double stator permanent magnet electric machine 1000. The machine comprises two support brackets 1104 and 1105. The support brackets are integrally formed with outer yoke 1106 that surrounds a circumference of the machine. In a preferred embodiment, depth of the outer yoke is about 35 cm. Heat sink 1108 is integrally formed on an exterior surface of the outer yoke. Outer stator 1120 is rigidly fixed within the outer yoke. Inner stator 1130 is rigidly connected to outer stator 1120 by a rear support (not shown). Rotor 110 is pivotally suspended between outer stator 1120 and inner stator 1130 by the rear support and is free to rotate about central axis 1131. When the machine is assembled, the outer stator and the inner stator are coaxial about central axis 1131. In a preferred embodiment, the depth of the outer stator, the inner stator and the rotor is about 30 cm.

Figure 1B:
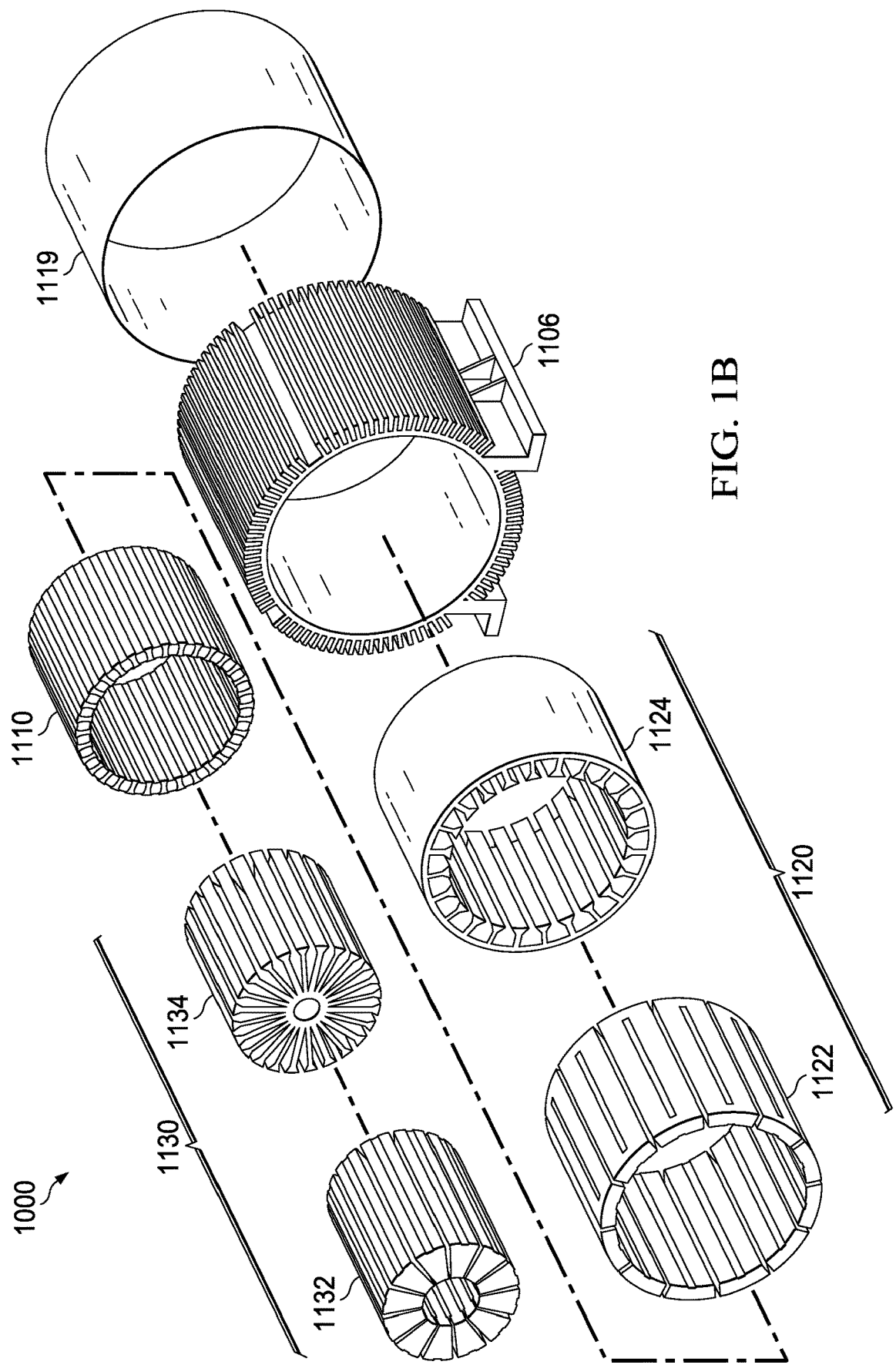
FIG. 1B is an exploded isometric drawing of a high torque density double stator permanent magnet electric machine.

FIG. 1B shows an exploded isometric view of the components of machine 1000. Outer yoke 1106 serves as a housing for the other components and as a heat sink for outer stator 1120. In a preferred embodiment, the outer yoke is comprised of a zinc aluminum alloy. Outer stator 1120 comprises outer stator windings 1122 and outer stator core 1124. Outer stator 1120 surrounds rotor 1110. Rotor 1110 rotates about inner stator 1130. Inner stator 1130 comprises inner stator windings 1132 and inner stator core 1134. Rear support 1119 is rigidly attached to the outer yoke, the outer stator and the inner stator and pivotally supports the rotor about the central axis of the machine.

Figure 2A:
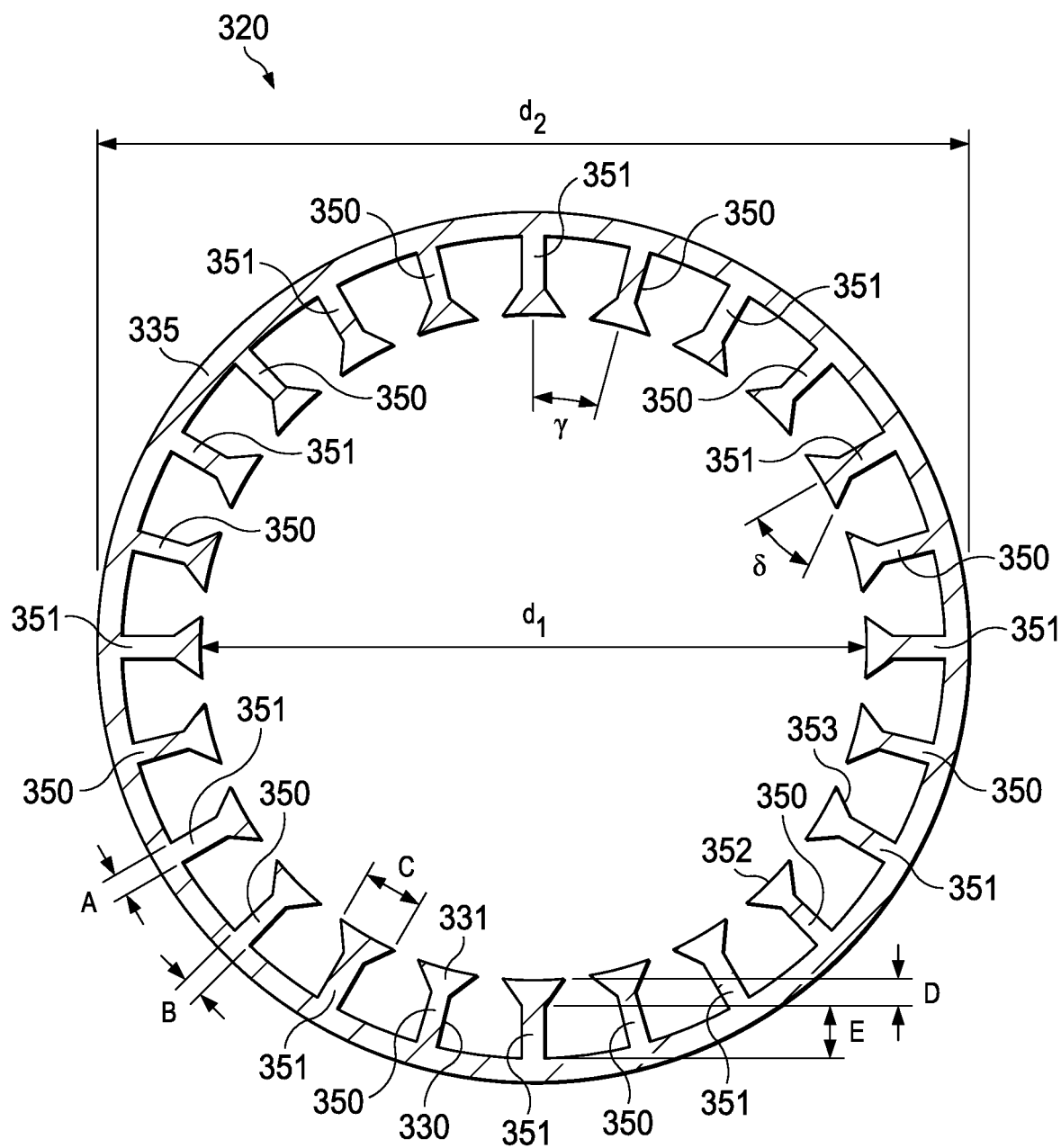
FIG. 2A is a cross section view of an outer stator.

FIG. 2A shows a cross-section view of outer stator 320. Outer stator 320 has 24 teeth of alternating width supported by yoke 335. Each tooth comprises stanchion 330 and trapezoidal angular flux director head 331. The stanchions are each integrally formed with yoke 335 and are radially directed inward at a spacing of angle "$\gamma$". In this embodiment, 12 teeth 350 are alternatively positioned between 12 teeth 351. Each of teeth 351 has a stanchion width of "A". Each of teeth 350 has a stanchion width of "B". Each of teeth 350 and 351 have a stanchion height of "E". Teeth 351 are poles and teeth 350 are interpoles, as will be further described. Each flux director head each includes arcuate inner surface 352 and flux directing angular flange 353. The flange angle is "$\delta$". The width of each flux director head is "c". The arcuate inner surfaces define a circle with diameter "$d_1$". The yoke defines an outer circle of diameter "$d_2$".

The following table represents a preferred list of the outer stator dimensions.

TABLE 1

| Dimension | | Tolerance |
|---|---|---|
| A | 0.68 cm | ±0.01 cm |
| B | 0.54 cm | ±0.01 cm |
| C | 1.56 cm | ±0.01 cm |
| D | 0.68 cm | ±0.01 cm |
| E | 2.2 cm | ±0.01 cm |
| $\gamma$ | 15° | ±2° |
| $\delta$ | 45° | ±5° |
| $d_1$ | 21.5 cm | ±0.01 cm |
| $d_2$ | 26.5 cm | ±0.01 cm |

Figure 2B:
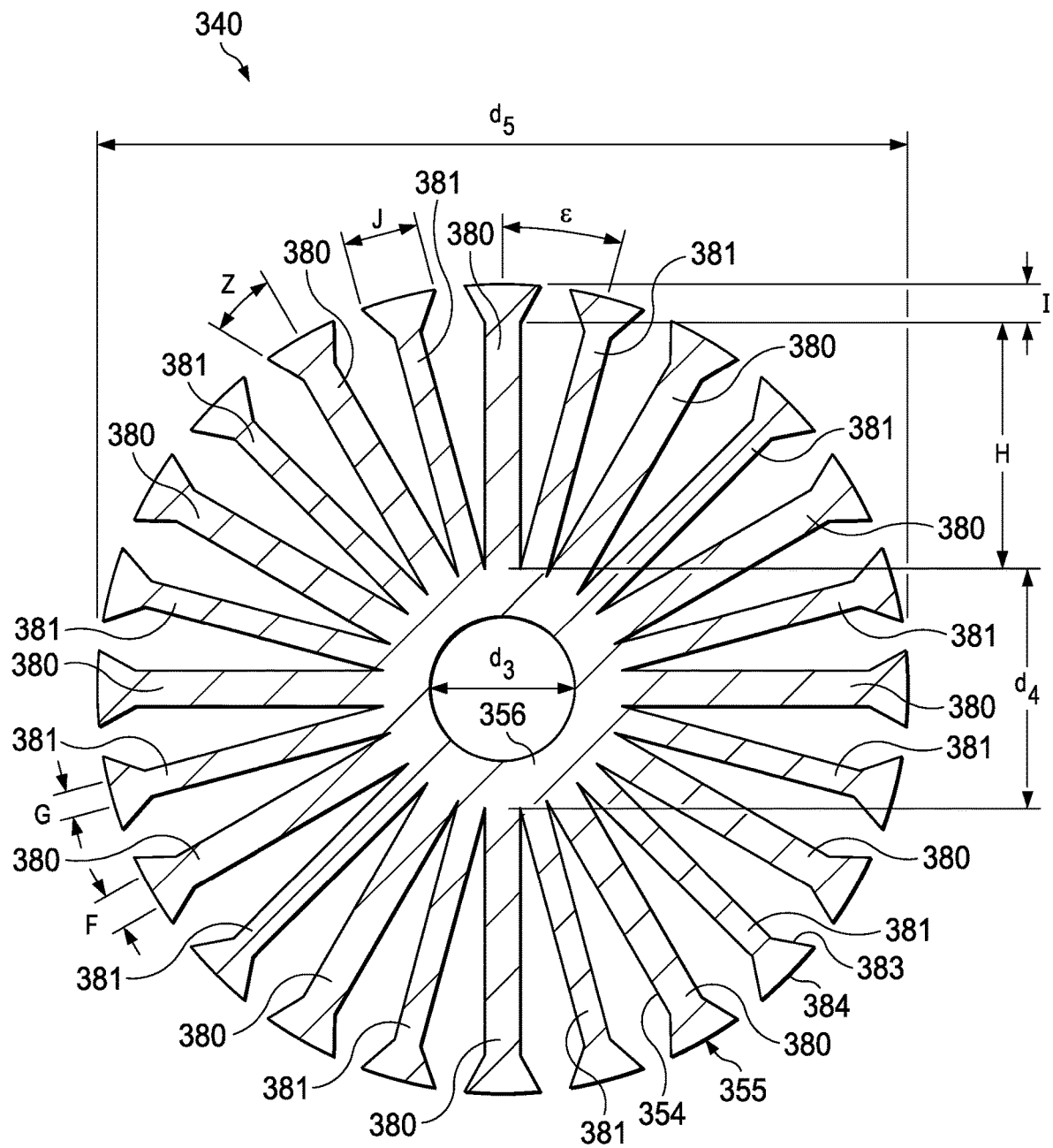
FIG. 2B is a cross section view of an inner stator.

FIG. 2B shows an embodiment of inner stator 340. Inner stator 340 has 24 teeth, of alternating width, supported by hub 356. The stanchions are integrally formed with hub 356 and are radially directed outward at angle "$\delta$". The hub has an inner diameter of "$d_3$" and an outer diameter of "$d_4$". Each tooth includes stanchion 354 and trapezoidal flux director head 355. In this embodiment, 12 teeth 380 are alternatively positioned between 12 teeth 381. Each of teeth 380 has a stanchion width of "F". Each of teeth 380 has a stanchion width of "F". Each of teeth 381 has a stanchion height of "G". Each flux director head has a height of "I".

Teeth 380 are poles and teeth 381 are interpoles, as will be further described. The flux director heads each further comprise arcuate outer surface 384 and flux directing angular flange 383. The arcuate outer surface defines a circle of diameter "$d_5$". The flange angle is "Z". The width of each flux director head is "J". The following table represents a preferred list of the inner stator dimensions.

TABLE 2

| Dimension | | Tolerance |
|---|---|---|
| F | 1.02 cm | ±0.01 cm |
| G | 0.68 cm | ±0.01 cm |
| H | 7.45 cm | ±0.01 cm |
| I | 1.28 cm | ±0.01 cm |
| J | 4.44 cm | ±0.01 cm |
| ε | 15° | ±2° |
| Z | 45° | ±5° |
| $d_3$ | 3.18 cm | ±0.01 cm |
| $d_4$ | 7.45 cm | ±0.01 cm |
| $d_5$ | 17.68 cm | ±0.01 cm |

The stators can have poles that are E-core type or I-core type. E-core type and I-core type poles comprise teeth assembled from two longitudinal sections that are connected at an intermediate location after positioning concentrated windings.

In preferred embodiments, the stators can be formed of non-orientated electric steel M19 (ASTM 36F155, 47F165 or 64F2000). However, other suitable stator materials are M15 (ASTM 36F145) and M22 (ASTM 36F165, 47F180 or 64F210).

In the following FIGS. 3A, 3B, 3C, 3D, 3E, 4A, 4B, 4C, 4D and 4E, "x" indicates windings into the page and "." indicates windings out of the page.

Figure 3A:
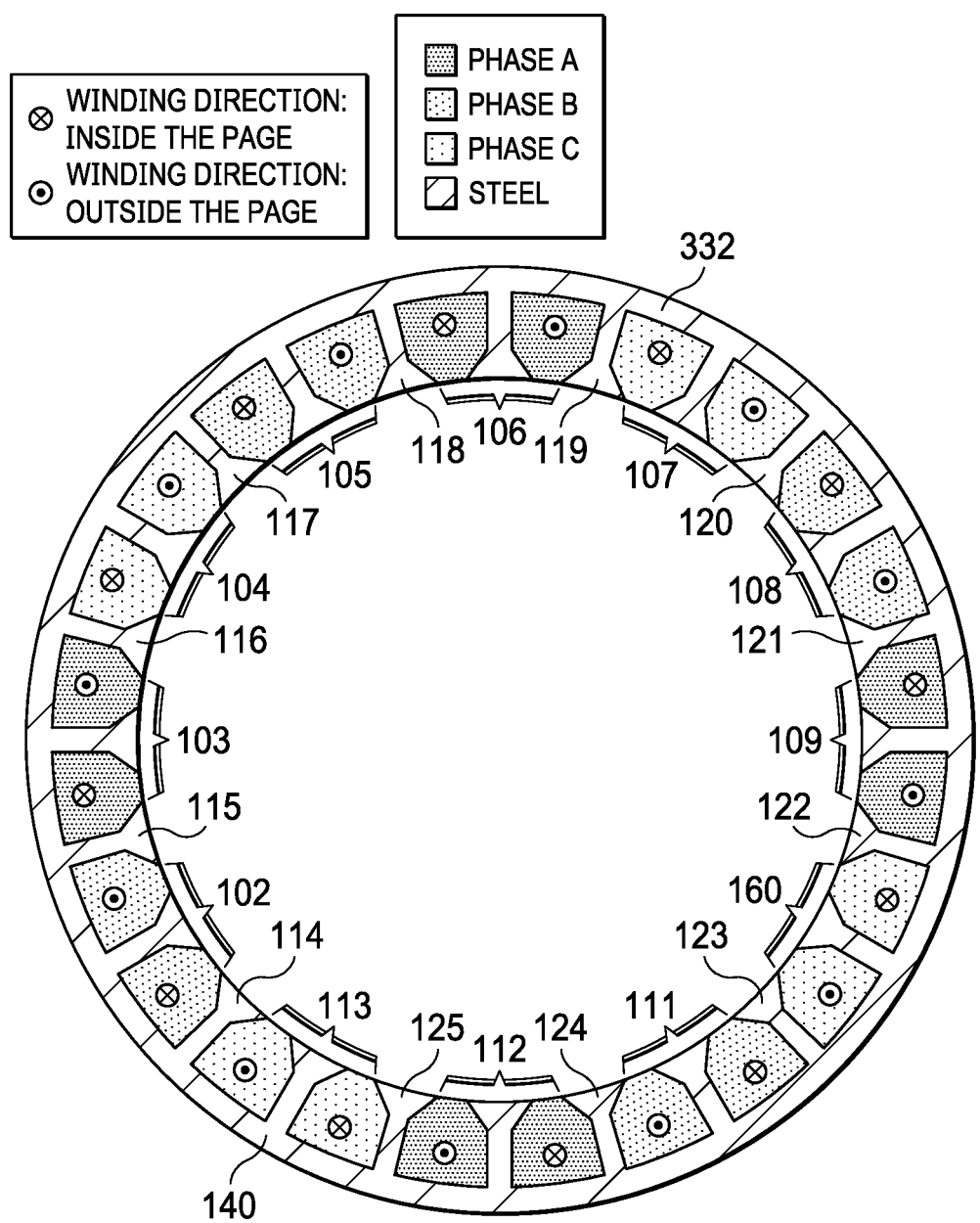
FIG. 3A is a cross-sectional view of an outer stator with windings around every other tooth.

Referring to FIG. 3A, outer stator windings are placed around alternating teeth of outer stator 332. Winding 102, 103, 104, 105, 106, 107, 108, 109, 110, 111, 112 and 113 result in 12 opposing poles. Each pole is centered on its respective stator tooth. Interpoles 114, 115, 116, 117, 118, 119, 120, 121, 122, 123, 124 and 125 result from teeth without windings. The poles and interpoles are arranged in an alternating sequence.

Figure 3B:
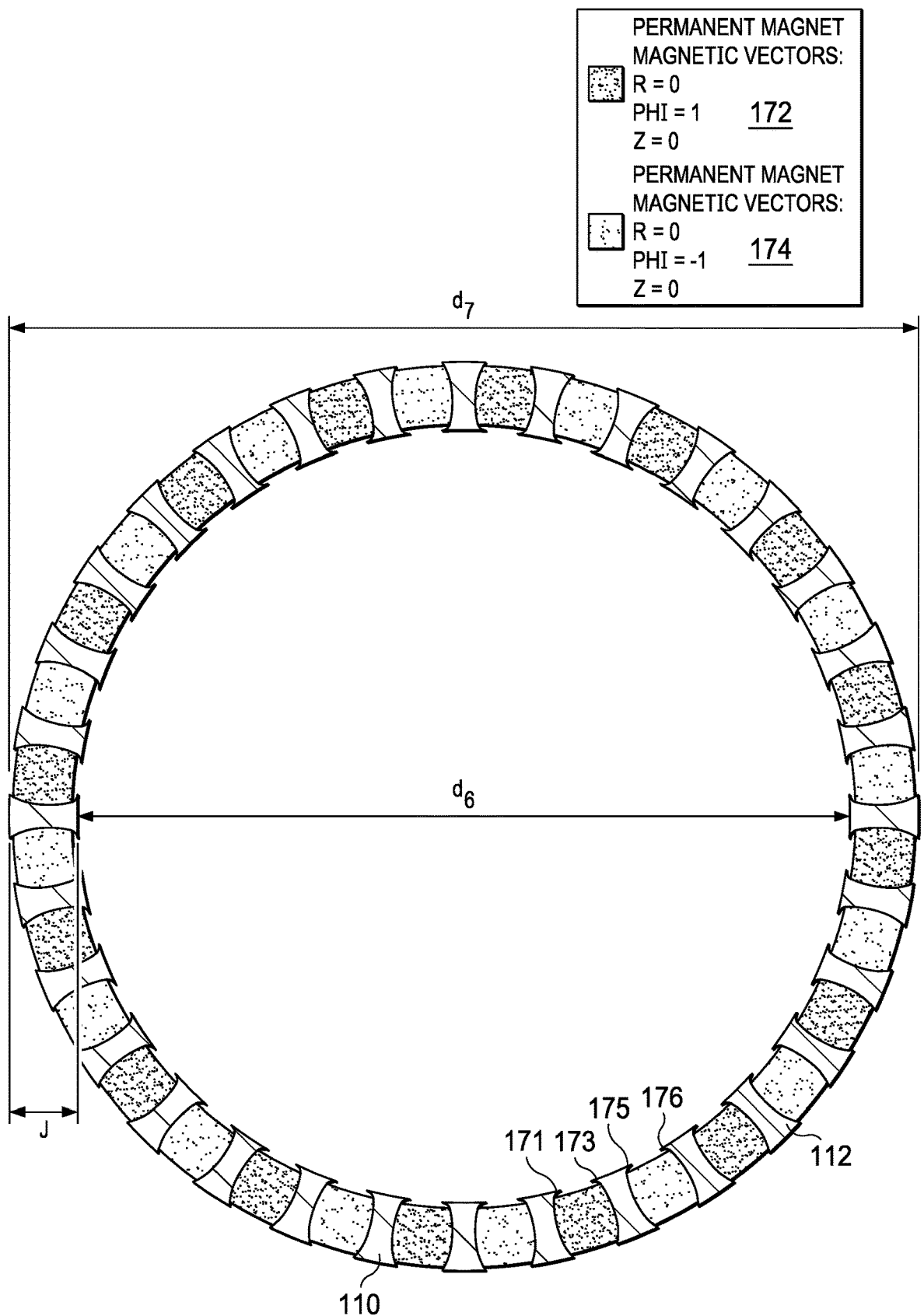
FIG. 3B is a cross-sectional view of a rotor of a preferred embodiment showing alternating polarity of the magnets.

Referring to FIG. 3B, rotor 110 has an inner diameter "$d_6$" of about 29.74 cm±0.01 cm and an outer diameter of "$d_7$" of about 32.31 cm±0.01 cm. Rotor 110 includes 32 magnet receivers 112. Each magnet receiver has a complex contour comprised of an inner bidirectional flange, an outer bidirectional flange, and a contoured central support, as will be further described. Sixteen (16) "clockwise" oriented permanent magnets 172 and sixteen (16) "counterclockwise" oriented permanent magnets 174 are located in alternating positions in the magnet receivers. One magnet receiver is located between each pair of permanent magnets. One magnet is located between each of the magnet receivers. Each of permanent magnets 172 has a magnetic vector R=0, Phi=1 and Z=0. Each of permanent magnets 174 has a magnetic vector R=0, Phi=−1 and Z=0. For example, permanent magnet 172 has positive pole 173 and negative pole 171. Permanent magnet 174 has positive pole 175 and negative pole 176. Thus, the dipoles of the permanent magnets are positioned in an alternating sequence and are all tangentially oriented. The tangentially orientation of the dipoles in an alternating polarity sequence dramatically increases the torque density of the machine.

In preferred embodiments, the rotor is made formed of a non-orientated electric steel M19 (ASTM 36F155, 47F165 or 64F2000). However, other suitable rotor materials are M15 (ASTM 36F145) and M22 (ASTM 36F165, 47F180 or 64F210).

Figure 3C:
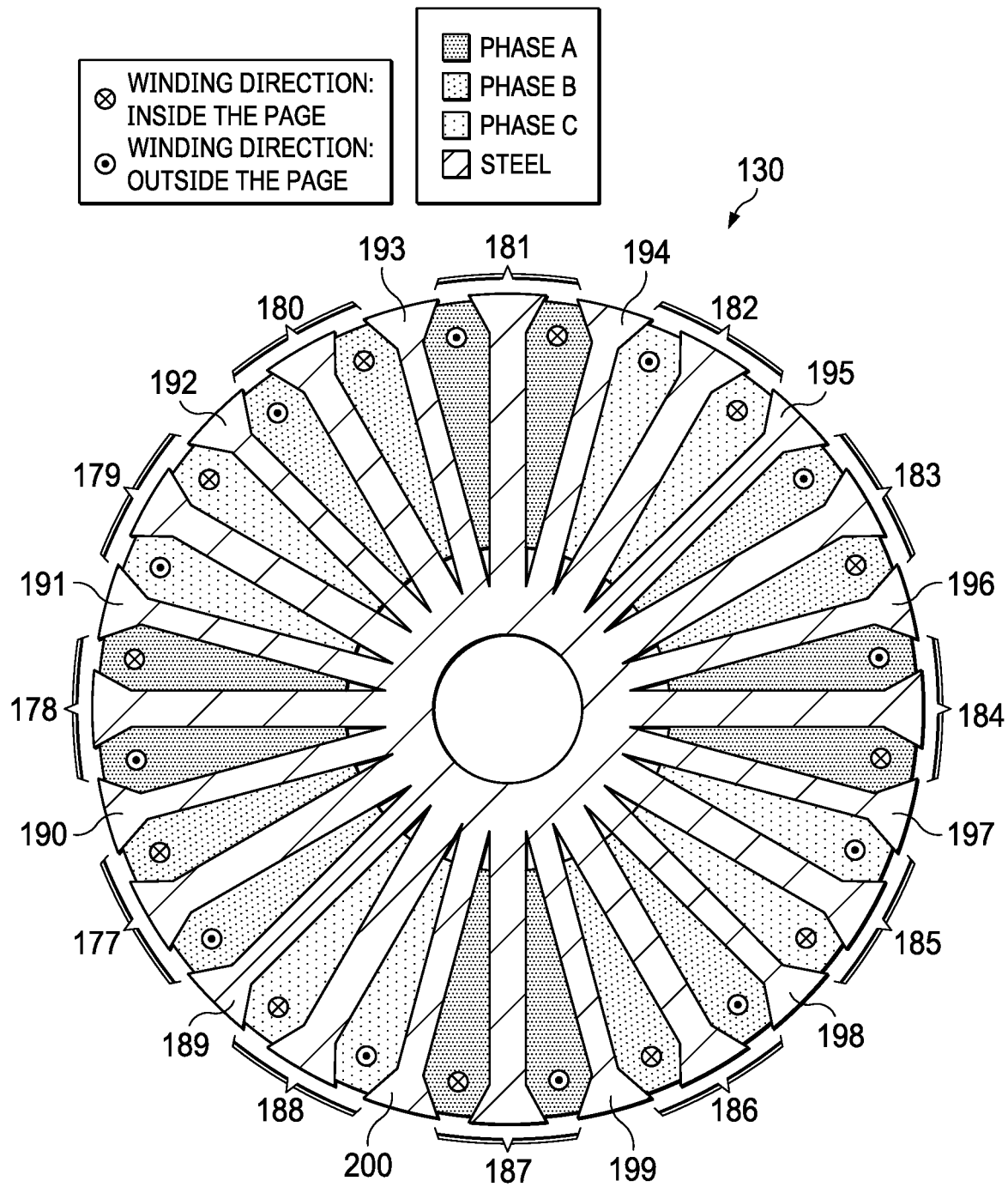
FIG. 3C is a cross-sectional view of an inner stator with windings around every other tooth.

Referring to FIG. 3C, inner stator concentrated windings 177, 178, 179, 180, 181, 182, 183, 184, 185, 186, 187 and 188 are placed around alternating teeth of the inner stator. The windings result in 12 poles. Inner stator teeth 189, 190, 191, 192, 193, 194, 195, 196, 197, 198, 199 and 200 are without windings and so are interpoles of the inner stator.

Windings around alternating teeth minimizes mutual inductance and decouples the phases. Increasing the spacing between the concentrated windings also reduces mutual inductance. The spacings between the concentrated windings are occupied by the interpoles. As a result, the machine is surprisingly fault tolerant.

Figure 3D:
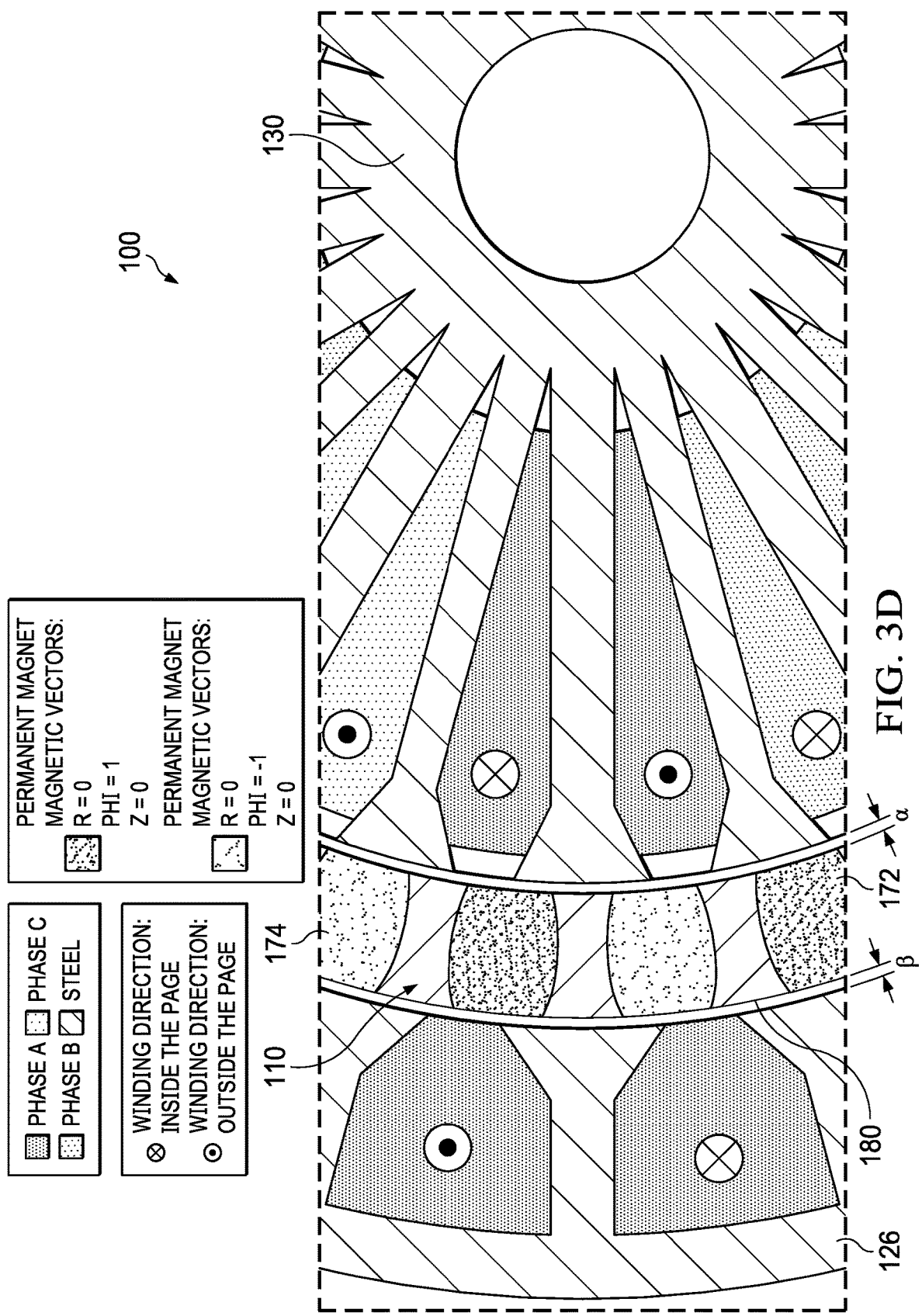
FIG. 3D is a partial cross-sectional view of a machine showing preferred air-gaps.

FIG. 3D shows a partial cross-section view of assembled machine 100. Inner air-gap α is located between inner stator 130 and rotor 110. Outer air-gap β is located between rotor 110 and outer stator 126. In one preferred embodiment, the inner air-gap α is approximately 0.5 mm and the outer air-gap β is approximately 0.75 mm. The smaller inner air-gap reduces the magnetic field intensity required from the concentrated windings of the inner stator. The reduced magnetic field intensity reduces the current density in the inner windings during steady state operation. The reduced current density, in turn, reduces the heat generated by resistance in the windings. A lower heat generated results in a lower inner stator winding temperature during operation. Importantly, the inner stator temperature is reduced while the average torque is not compromised.

Referring to FIGS. 3A, 3C and 3E, a preferred embodiment of assembled machine 100 is shown.

This embodiment of the machine is energized in three phases, phase A, phase B, and phase C. Phase A implicates outer stator windings 103, 106 and 109 and 112 and inner stator windings 178, 181, 184 and 187. Phase B implicates outer stator winding 102, 105, 108 and 111 and inner stator windings 177, 180, 183 and 186. Phase C implicates outer stator windings 104, 107, 160 and 113 and inner stator windings 179, 182, 185 and 188.

The current density in the inner stator windings is a function of the energizing current and the cross-sectional area of the wire in the windings.

One preferred embodiment of the invention reduces the current density in the windings of the inner stator by energizing the inner stator with a lower current compared to that of the outer stator. The current for the inner stator and the outer stator is provided by a dual 3-phase drive controller such as dual UMC100.3 controllers available from ASEA Brown Boveri of Switzerland; or dual F-6K drives or dual G-6 drives available from KEB America of Shakopee, Minnesota. In a preferred embodiment, the controller is set to supply the inner stator with 115 amps and the outer stator with 126 amps.

Another embodiment of the invention reduces the current density in the concentrated windings of the inner stator by increasing the gauge of the wire used in the windings in the inner stator. Heavier gauge wire requires each turn around the tooth to occupy more space than a lighter gauge wire. But, heavier gauge wire reduces the number of turns per winding, resulting in a lower winding density per unit area. A lower winding density does not negatively impact the machine, because the required magnetic field intensity is reduced by the smaller inner air gap α.

In one example, where the outer stator steady state winding current is 126 A and the inner stator steady state winding current is 126 A, the cross-sectional area of the wire in the outer stator concentrated windings is 21 mm², the cross-sectional area of the wire in the inner stator concentrated windings is 63 mm², the energizing 3-phase voltage of the inner stator and the outer stator is 600V. The resulting current density of inner windings was determined to be about 2 A/mm². Likewise, the current density of outer windings was determined to be about 6 A/mm².

Figure 4A:
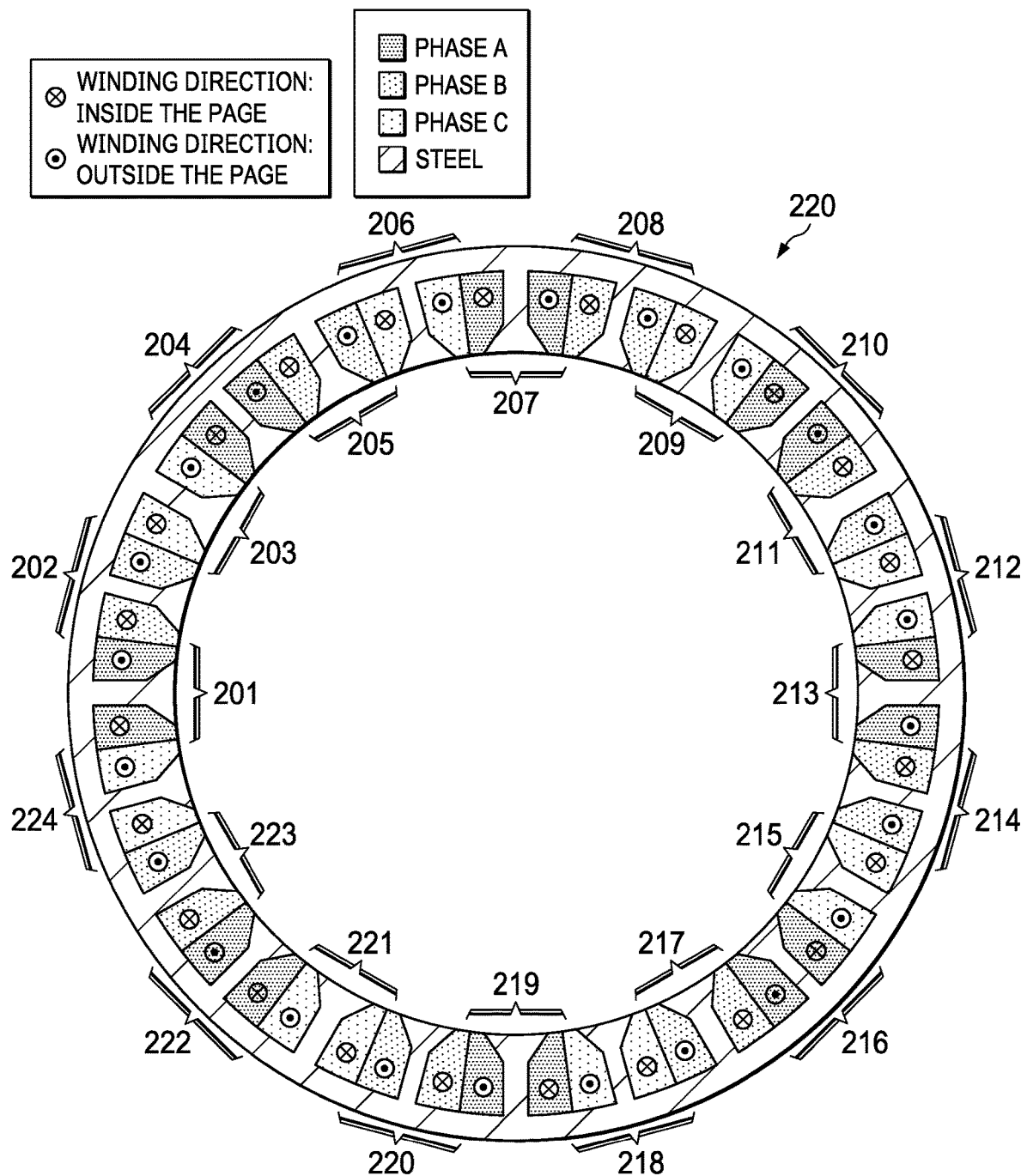
FIG. 4A is a cross-section view of an outer stator with windings around every tooth.

Referring to FIG. 4A, outer stator 163 has twenty-four (24) teeth, as previously described. In this embodiment, there are concentrated windings around each of the twenty-four (24) teeth.

One winding is placed around each of the teeth, resulting in twenty-four (24) opposing poles, each centered on one respective tooth.

In this embodiment there are windings around all the stator poles resulting in twenty-four (24) windings on the outer stator. The concentrated winding poles are closer together resulting in coupled phases and, therefore there is somewhat reduced fault tolerance.

Figure 4B:
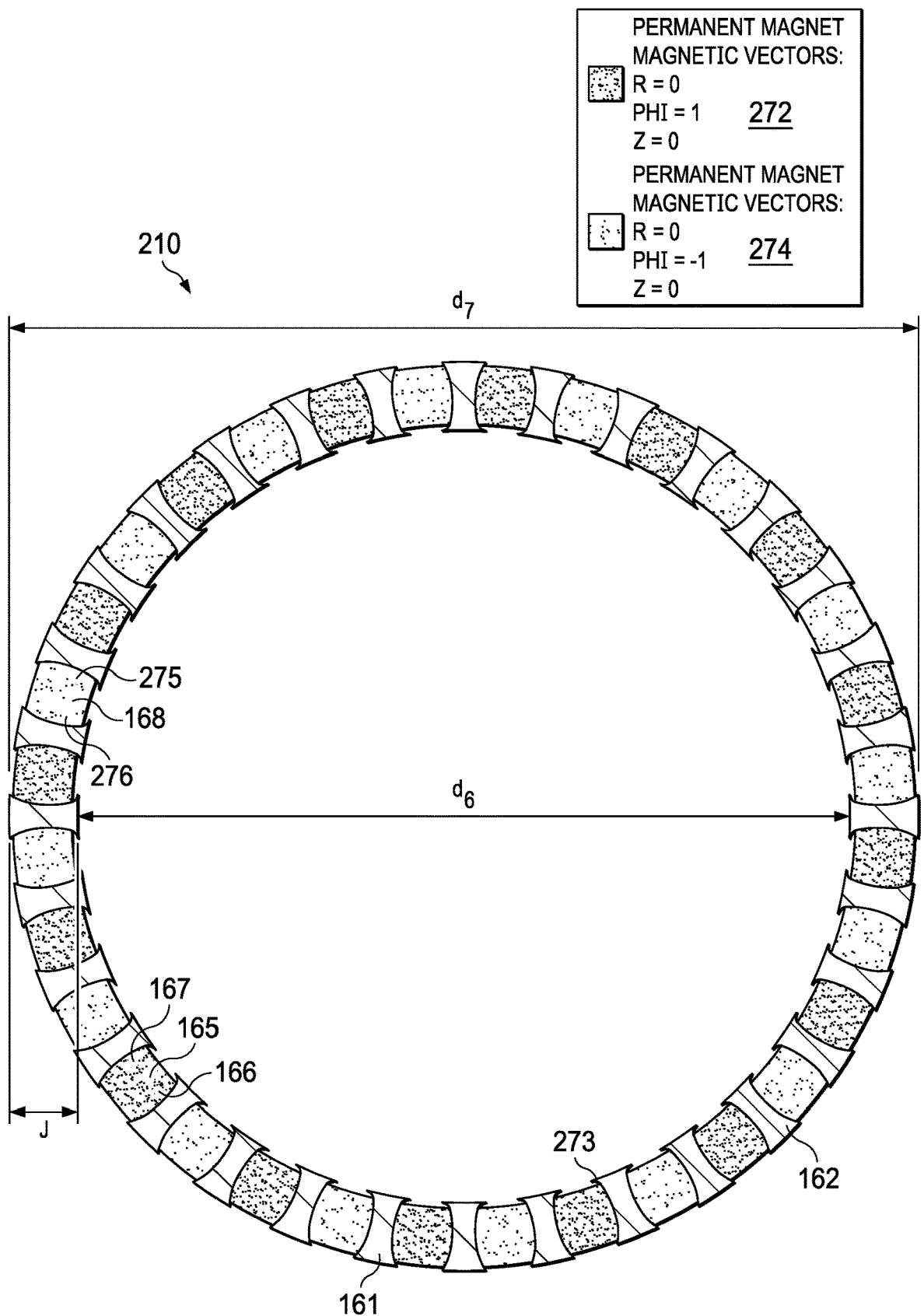
FIG. 4B is a cross-section view of a rotor of a preferred embodiment.

Referring to FIG. 4B, rotor 161 has an inner diameter "$d_6$" of about 29.74 cm±0.01 cm and an outer diameter of "$d_7$" of about 32.31 cm±0.01 cm. Rotor 161 includes thirty-two (32) magnet receivers 162. Each magnet receiver has a complex contour, as will be further described. Sixteen (16) "clockwise" oriented permanent magnets 272 and sixteen (16) "counterclockwise" oriented permanent magnets 274 are located in alternating positions in the magnet receivers. One magnet receiver is located between each pair of permanent magnets. Each of permanent magnets 272 has a magnetic vector R=0, Phi=1 and Z=0. Each of permanent magnets 274 has a magnetic vector R=0, Phi=−1 and Z=0. For example, permanent magnet 165 has positive pole 166 and negative pole 167. Permanent magnet 168 has positive pole 275 and negative pole 276. Thus, the dipoles of the permanent magnets are positioned in an alternating sequence and are all tangentially oriented. The tangentially orientation of the dipoles in an alternating polarity sequence dramatically increases the torque density of the machine.

Figure 4C:
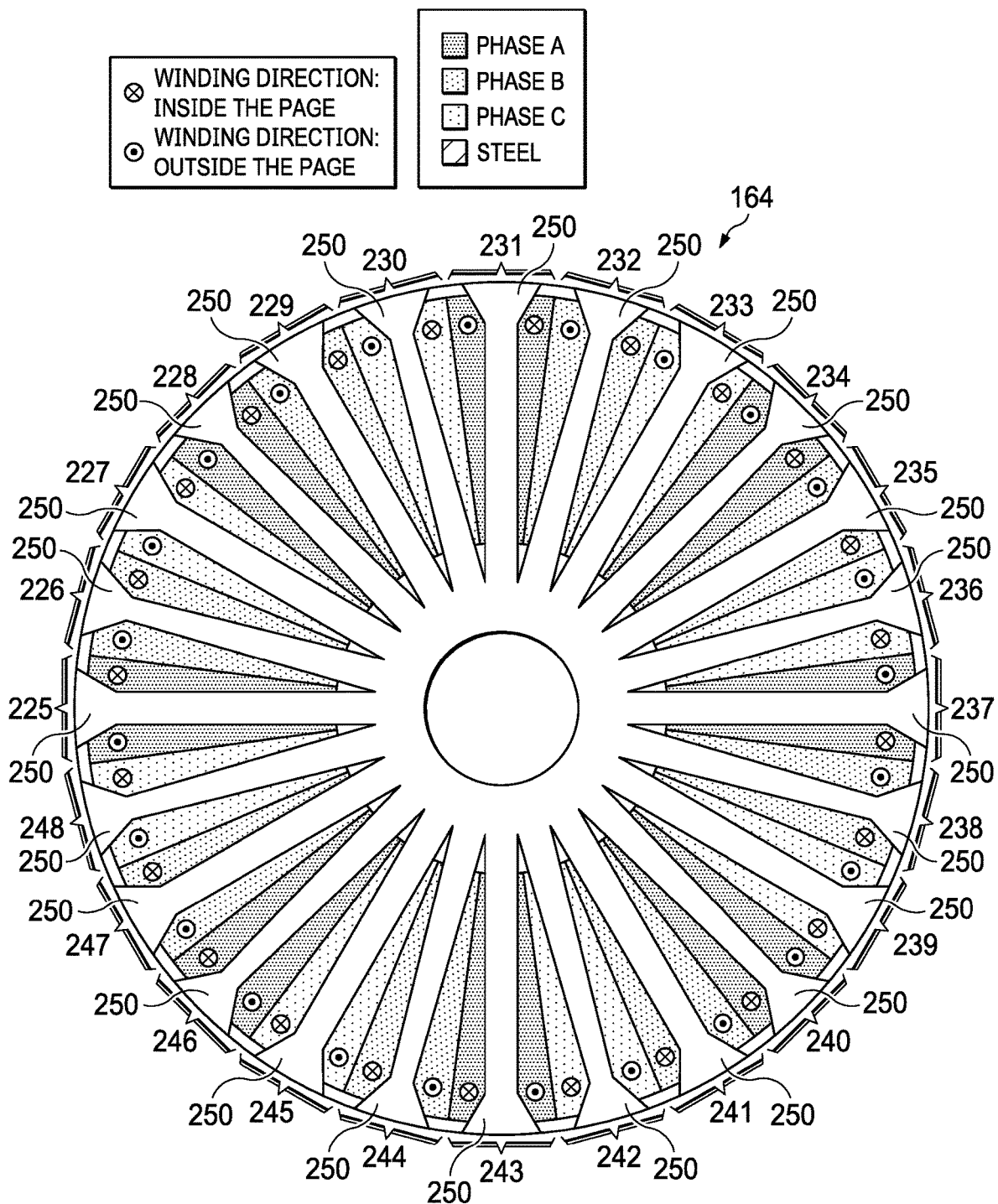
FIG. 4C is a cross-section view of an inner stator with windings around every tooth.

Referring to FIG. 4C, inner stator 164 has twenty-four (24) inner stator teeth 250. One of inner stator concentrated windings, 225, 226, 227, 228, 229, 230, 231, 232, 233, 234, 235, 236, 237, 238, 239, 240, 241, 242, 243, 244, 245, 246, 247 and 248 is placed around each of the 24 teeth of the inner stator. Thus, the inner stator has 24 opposing poles centered on each of the 24 teeth.

Figure 4D:
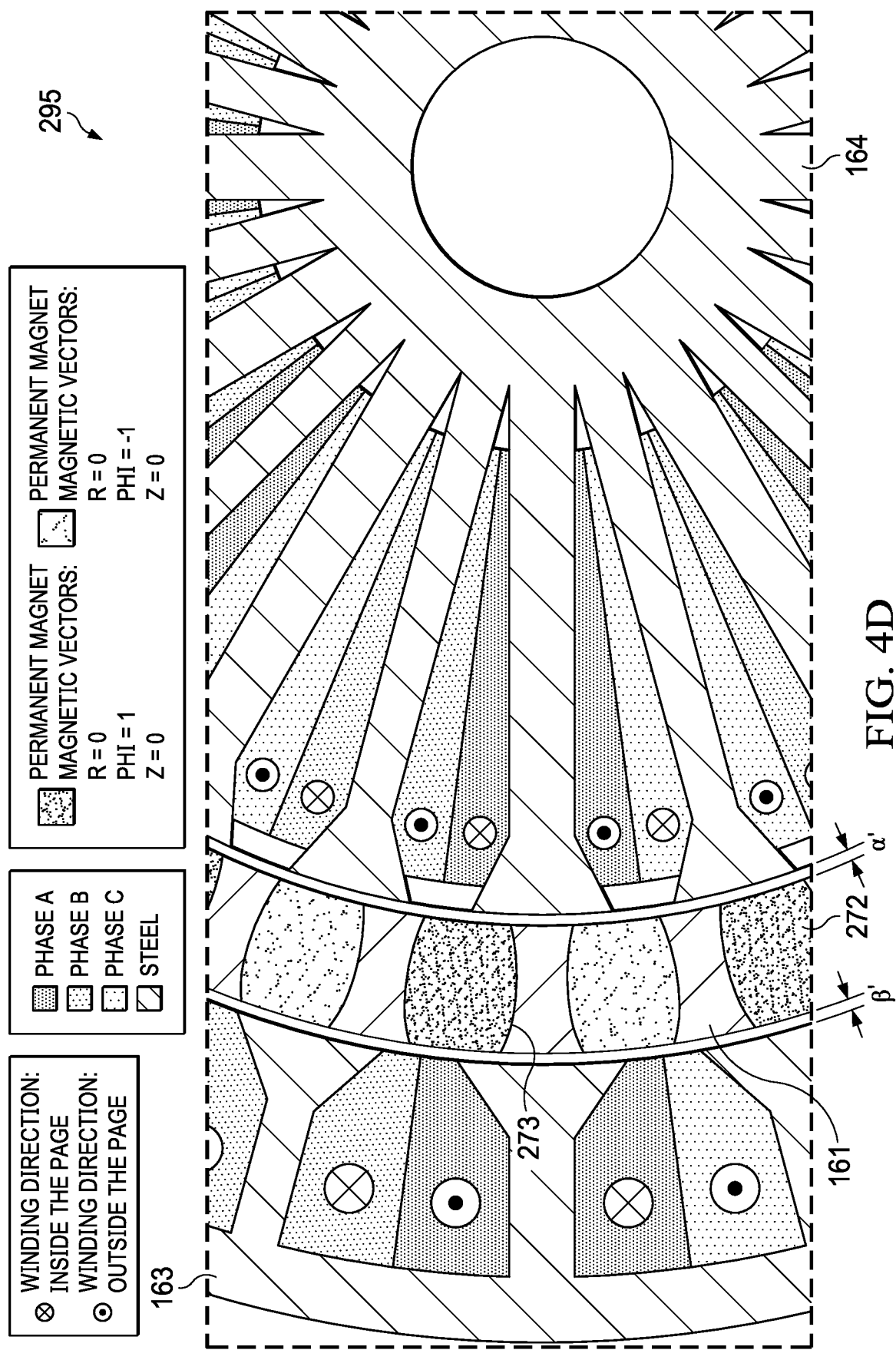
FIG. 4D is a partial cross-section view of a machine showing preferred air-gaps.

FIG. 4D shows a cutaway view of a portion of assembled machine 295. Inner air-gap α' is located between the inner stator 164 and rotor 161. Out air-gap β' is located between rotor 161 and outer stator 163. In this embodiment, inner air-gap α' is approximately 0.45-0.55 mm, and outer air-gap β' is approximately 0.70-0.80 mm. The smaller a' inner air-gap permits the use of a lower current density in the inner concentrated windings compared to the current density in the outer concentrated windings without compromising the average torque. Thus, the inner stator winding temperature is reduced while the average torque is not compromised.

Figure 4E:
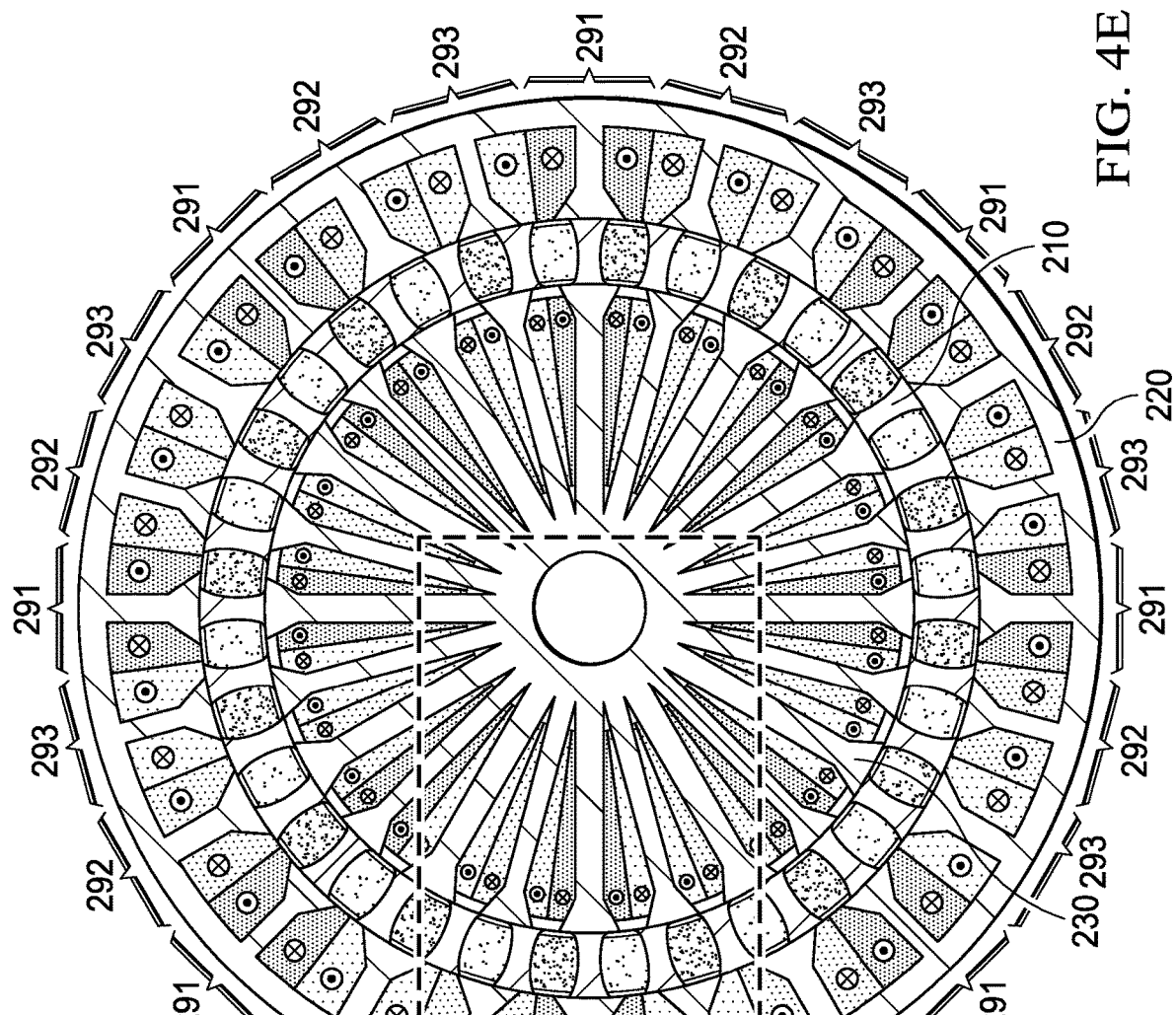
FIG. 4E is a cross section of a preferred embodiment of an assembled machine.

Referring to FIGS. 4A, 4C and 4E, a cutaway view of assembled machine 295 is shown. Assembled machine 295 is energized in three phases, phase A, phase B and phase C. Phase A implicates outer stator poles 201, 204, 207, 210, 213, 216, 219 and 222, and inner windings 225, 228, 231, 234, 237, 240, 243 and 246. Phase B implicates outer stator winding 223, 202, 205, 208, 211, 214, 217, 220 and 223, and inner stator windings 247, 226, 229, 232, 235, 238, 241, 244 and 247. Phase C implicates outer stator windings 203, 206, 209, 212, 215, 218, 221 and 224, and inner stator windings 227, 230, 233, 236, 239, 242, 245, and 248.

Figure 5A:
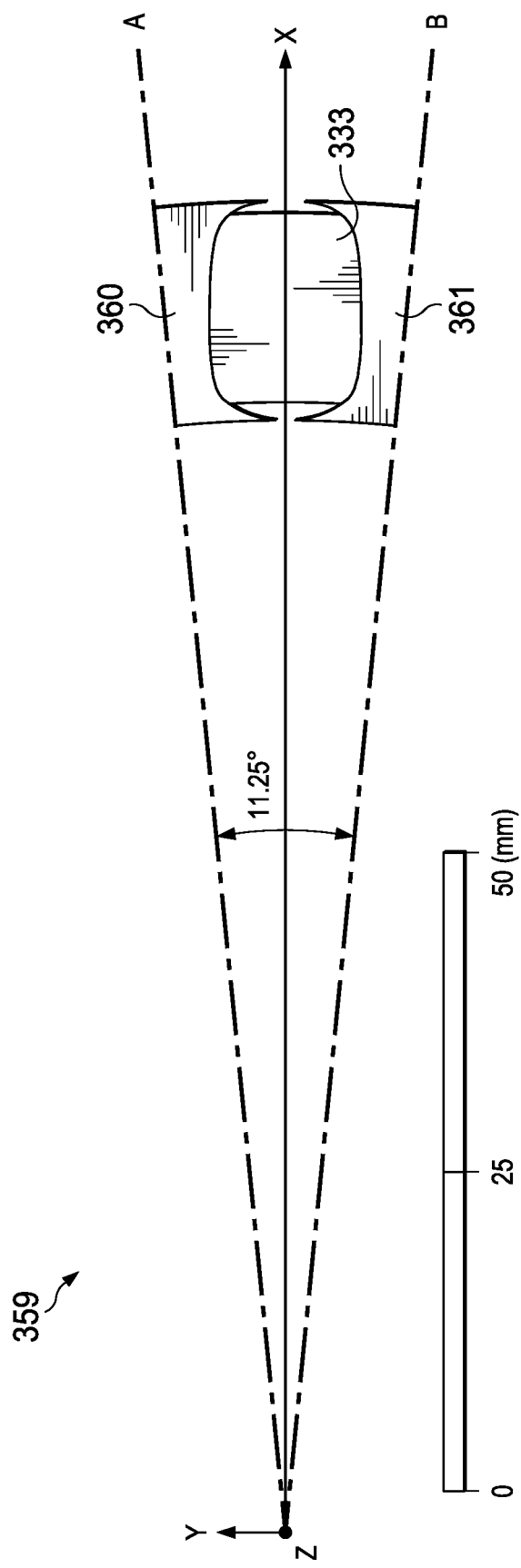
FIG. 5A is a partial cross-section view of a rotor.

FIG. 5A shows of a typical rotor segment 359. Rotor segment 359 includes magnet 333 and one half of each of magnet receiver 360 and 361. Rotor segment 359 is symmetrical about the x axis. The magnet receivers are set at a pole pitch of 11.25°±1°. Each magnet receiver is symmetrical with respect to its radial axis. The radial axes in this figure are labeled "A" and "B". In a preferred embodiment, the rotor segment is duplicated 32 times around the central axis to complete rotor.

Figure 5B:
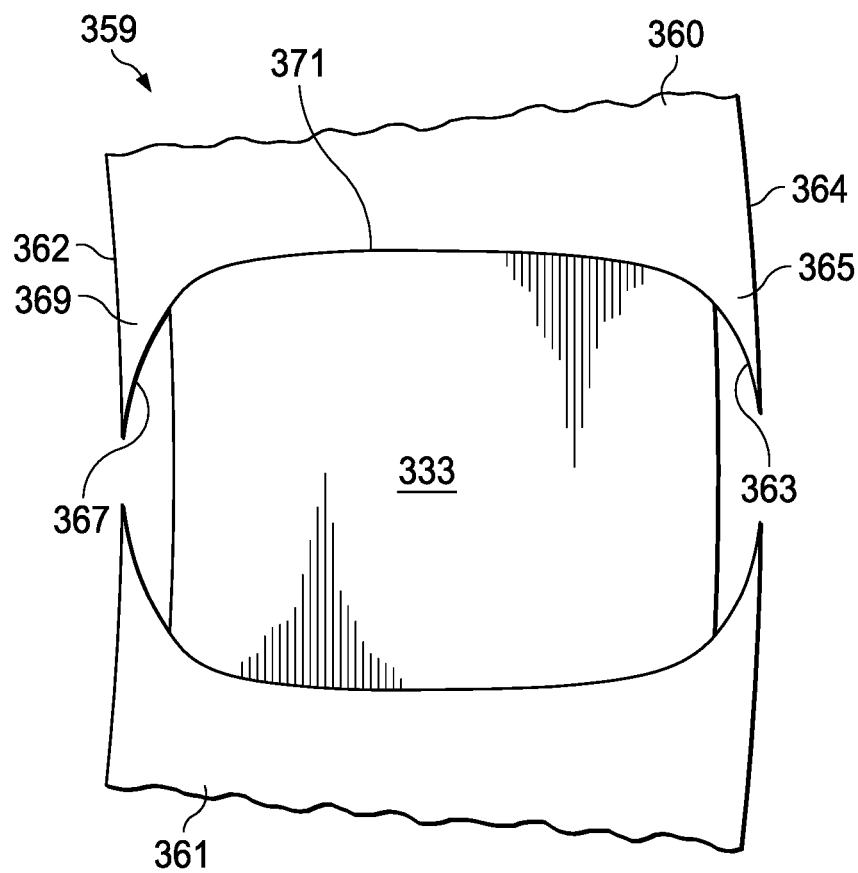
FIG. 5B is a partial cross-section view of a rotor.

FIG. 5B shows magnet 333 located between magnet receivers 360 and 361. Magnet receiver 360 comprises inner radial side 362 and outer radial side 364. In a preferred embodiment, inner radial side 362 has a radius of about 88.9 mm±0.1 mm. Outer radial side 364 has a radius of about 106.5 mm±0.1 mm. Tapered flange 369 is positioned adjacent inner radial side 362. Tapered flange 365 is positioned adjacent outer radial side 364. Tapered flange 369 includes flange surface 367. Tapered flange 365 includes flange surface 363. Tapered flange surface 367 and 363 are connected by concave surface 371.

In a preferred embodiment, flange surface 363 is defined by an arc of a circle with the following parameters:

$$(x-97.5)^2+(y+0.44)^2=9.26^2$$

$$105.3 \text{ mm} < x < 106.5 \text{ mm}$$

$$1.3 \text{ mm} < y < 4.74 \text{ mm}$$

In a preferred embodiment, concave surface 371 is defined by an arc of an ellipse with the following parameters:

$$\frac{(x-98)^2}{7.5^2}+\frac{(y-5)^2}{0.975^2}=1$$

$$90.23 \text{ mm} < x < 105.3 \text{ mm}$$

$$4.55 \text{ mm} < y < 4.74 \text{ mm}$$

In a preferred embodiment, flange surface 367 is defined by an arc of a circle with the following parameters:

$$(x-96)^2+y^2=7.21^2$$

$$88.9 \text{ mm} < x < 90.23 \text{ mm}$$

$$0.89 \text{ mm} < y < 4.55 \text{ mm}$$

The shapes of the magnets, magnet receivers and rotor segments drastically reduce local demagnetization of the magnets, as will be further described.

Figure 5C:
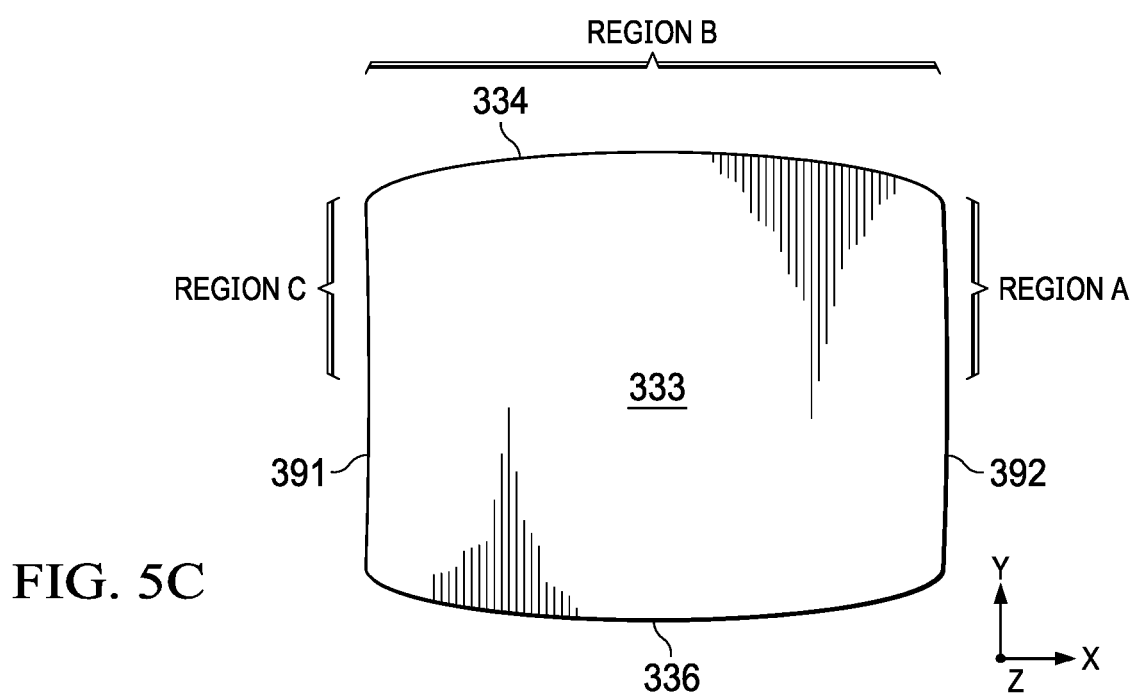
FIG. 5C is a cross section view of a permanent magnet.

FIG. 5C shows magnet 333. Magnet 333 includes inner radial side 391 and outer radial side 392. In a preferred embodiment radial side 391 has a radius of about 90.23 mm±0.1 mm. Outer radial side 392 has a radius of about 105.3 mm±0.1 mm. The magnet is further comprised of convex surface 334 and convex surface 336. The magnet is symmetrical about the x axis. The poles of the magnets are positioned at the convex surfaces. In this example, the positive pole is located at convex surface 334. The negative pole is located at convex surface 336. In a preferred embodiment, the magnets are a ferrite material.

Region A defines one half of outer radial side 392. Both halves are mirror images of each other. In a preferred embodiment, the curve equation in region A is an arc of a circle with the following parameters:

$$x^2+y^2=105.3^2$$

$$105.2 \text{ mm} < x < 105.32 \text{ mm}$$

$$0 \text{ mm} < y < 4.74 \text{ mm}$$

Region B defines convex surface 334. In a preferred embodiment, the curve equation in region B is an arc of an ellipse with the following parameters:

$$\frac{(x-98)^2}{7.5^2} + \frac{(y-5)^2}{0.975^2} = 1$$

$$90.23 \text{ mm} < x < 105.3 \text{ mm}$$

$$4.55 \text{ mm} < y < 4.74 \text{ mm}$$

The shape of convex surface 336 is symmetrical with respect to the shape of convex surface 334.

Region C defines one half of inner radial side 391. Both halves are mirror images of each other. In a preferred embodiment, the curve equation in region C is arc of a circle with the following parameters:

$$x^2+y^2=90.23^2$$

$$90.13 \text{ mm} < x < 90.23 \text{ mm}$$

$$0 \text{ mm} < y < 4.55 \text{ mm}$$

A radius of about 1 mm is provided at each perimeter corner of the magnet as a transition between the curves.

Figure 6A:
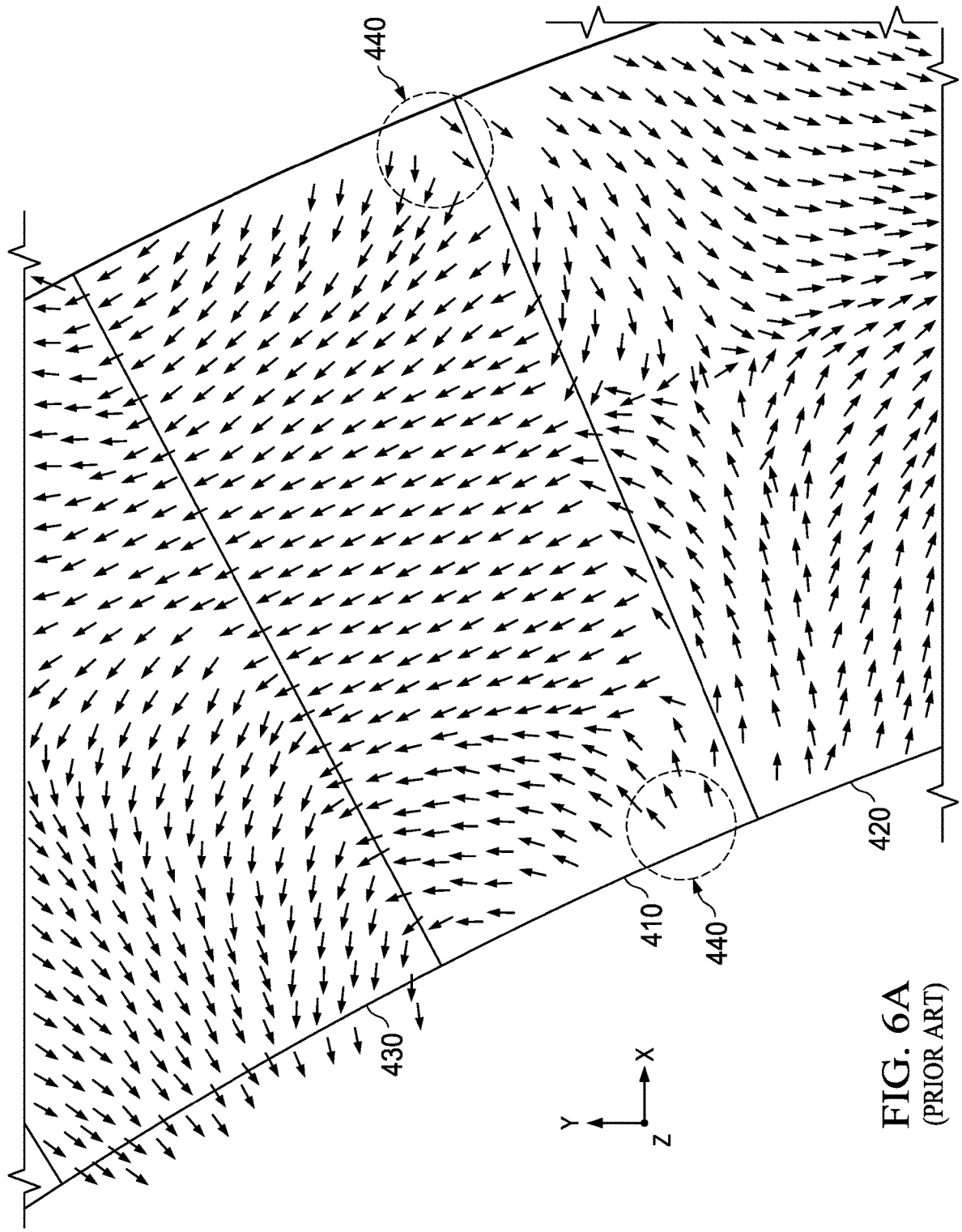
FIG. 6A is a magnetic dipole moment diagram of a machine of the prior art.

FIG. 6A shows flux diagram of permanent magnet 410 coupled between magnet receiver 420 and magnet receiver 430 in a prior art machine. There are two demagnetized areas 440 indicated by circles. These demagnetized areas have undesirable disoriented dipoles located in the trailing corners of permanent magnet 410.

Figure 6B:
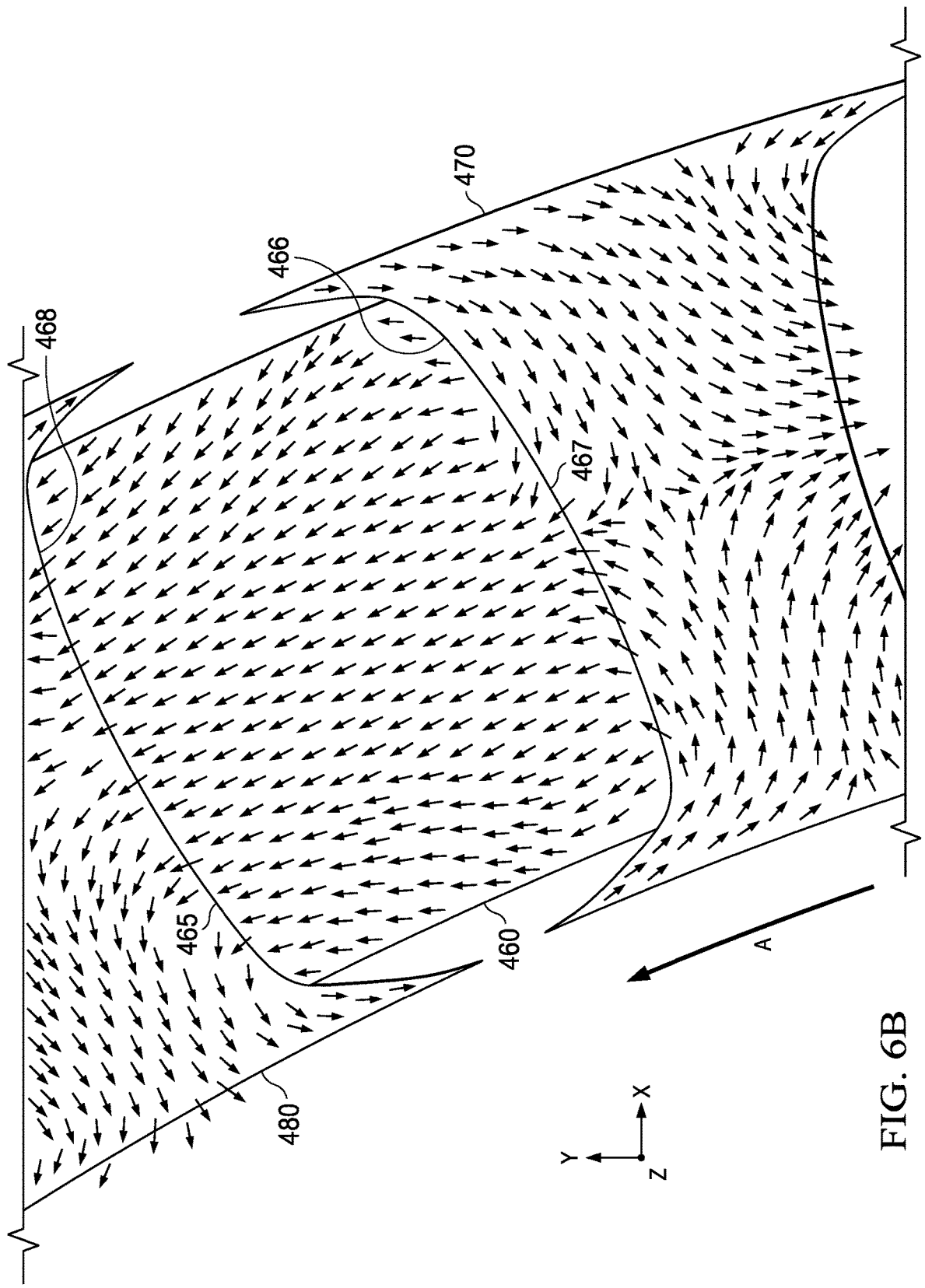
FIG. 6B is a magnetic dipole moment diagram of a machine of a preferred embodiment.

FIG. 6B shows flux diagram of permanent magnet 460 coupled between magnet receiver 470 and magnet receiver 480 in a preferred embodiment of the invention. Permanent magnet 460 has convex surface 466 and convex surface 465. Convex surface 466 defines negative pole 467. Convex surface 465 defines positive pole 468.

The direction of rotation of the rotor is indicated by arrow "A".

The magnet clearly demonstrates no demagnetized. The absence of demagnetized areas shows an advantageous result due to the complex topologies of the magnet and of the magnet receivers of the rotor.

FIG. 7 shows graph 500 of torque versus time for a preferred embodiment of the machine. Portion 510 of the graph is shown with an exploded torque scale and a condensed time scale within pane 520. The machine in this example, is controlled by a switching controller, as previously described.

Between about 2.4 milliseconds and 4.1 milliseconds the machine demonstrates a sinusoidal oscillating torque ranging from between about 1286 N m and about 1348 N m. The period of the sinusoid is about 5 milliseconds.

Figure 8:
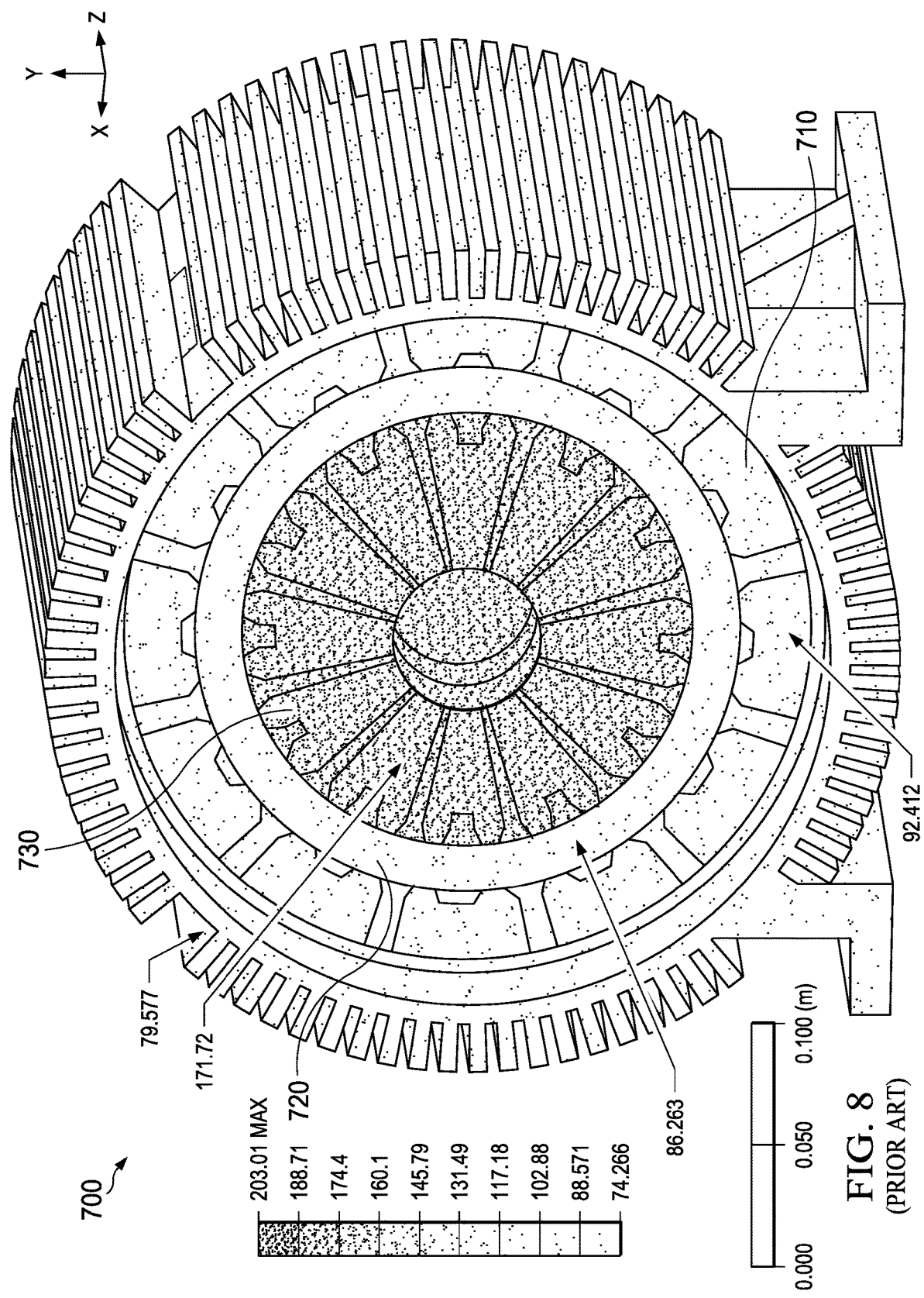
FIG. 8 is a temperature distribution map for a prior art machine.

FIG. 8 shows a temperature map of a prior art machine 700 based on test results. A first air-gap defined between inner stator 730 and rotor 720 is approximately equal to a second air-gap defined between outer stator 710 and the rotor 720. The inner stator 730 has a first current density in the windings that is approximately equal to a second current density in the windings of outer stator 710. In this prior art example, the current density of the inner and outer windings is approximately 4 A/mm². The inner air-gap and the outer air-gap are both approximately 0.75 mm. The average torque is approximately 449 Nm at approximately 477 rpm.

After approximately 10,000 seconds, the outer stator 710 has a winding temperature of approximately 92° C. After approximately 10,000 seconds, rotor 720 has a temperature of approximately 86° C. After approximately 10,000 seconds, inner stator 730 has a winding temperature of approximately 172° C.

The large difference between the outer and inner winding temperatures after approximately 10,000 second shows a problematic build-up of heat in the inner windings.

Figure 9:
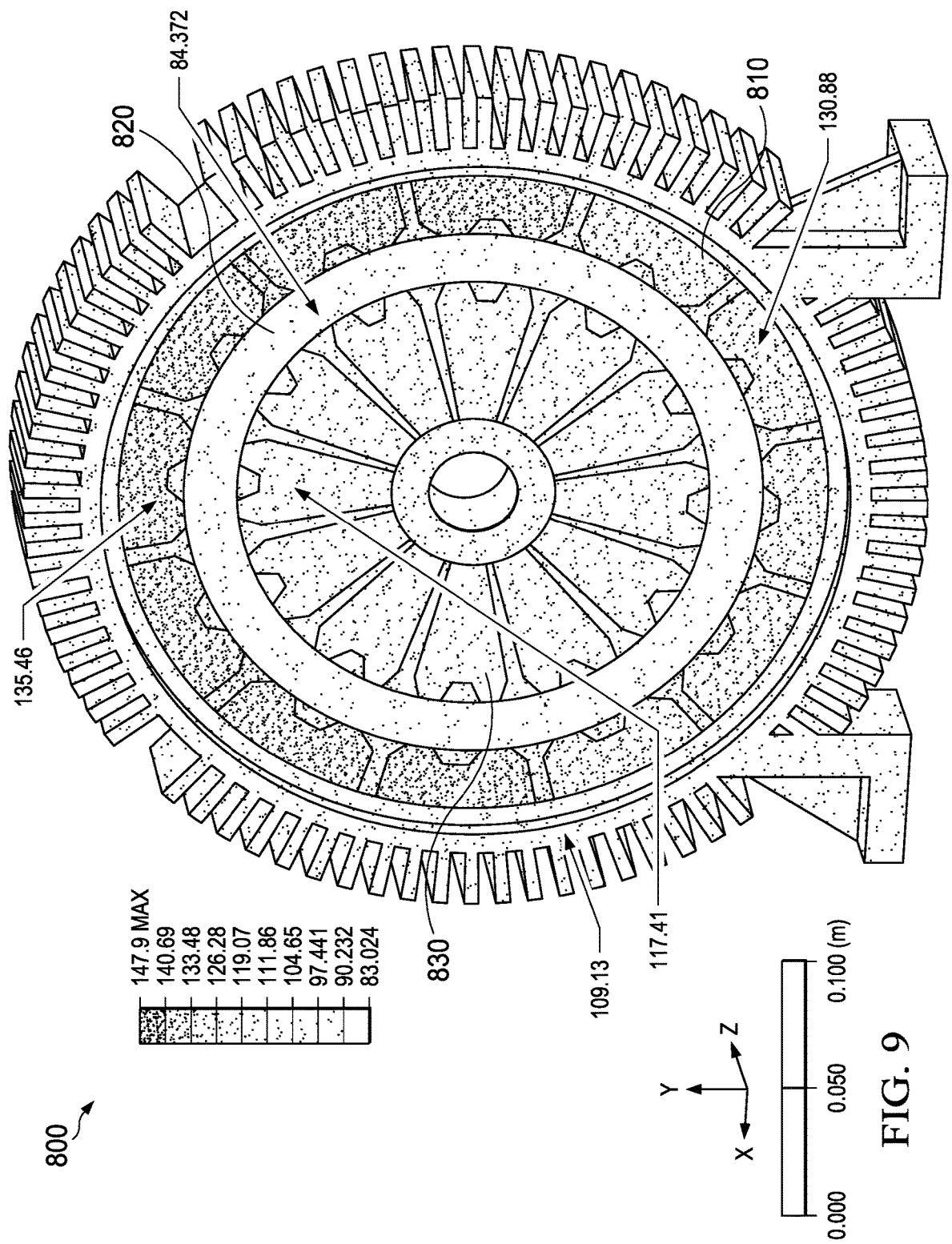
FIG. 9 is a temperature distribution map for a preferred embodiment of a machine.

FIG. 9 shows a temperature map of machine 800, with windings around every other tooth, according to the present invention, based on test results. A first air-gap defined between inner stator 830 and rotor 820 is less than a second air-gap defined between outer stator 810 and rotor 820. Inner stator 830 has a first current density in the windings that is less than a second current density in the windings of outer stator 810. In this particular embodiment, the inner air-gap α is equal to approximately 0.5 mm and the outer air-gap β is equal to approximately 0.75 mm. In this embodiment, the current density of inner windings and outer windings are approximately 2 A/mm² and approximately 6 A/mm², respectively. The average torque is 435 Nm at 477 rpm which is reduced by only about 3%.

After approximately 10,000 seconds, outer stator 810 has a upper temperature of approximately 135° C. and a lower temperature of approximately 131° C. After approximately 10,000 seconds, rotor 820 has a temperature of approximately 84° C. After approximately 10,000 seconds, inner stator 830 has a temperature of approximately 117° C. Thus, the temperature of the inner stator is less than the temperature of the outer stator.

The outer and inner winding temperatures after approximately 10,000 seconds show that heat build-up in inner stator 830 is dramatically reduced over the prior art.

FIG. 10A shows graph 910 of flux density of an outer stator main pole versus time for a machine of the present invention with windings around every other tooth. Flux density minimum 912 of about −1.5 wb/m² and flux density maximum 914 of about 1.5 wb/m² occur at approximately 0.9 and approximately 4.7 milliseconds, respectively.

Figure 10B:
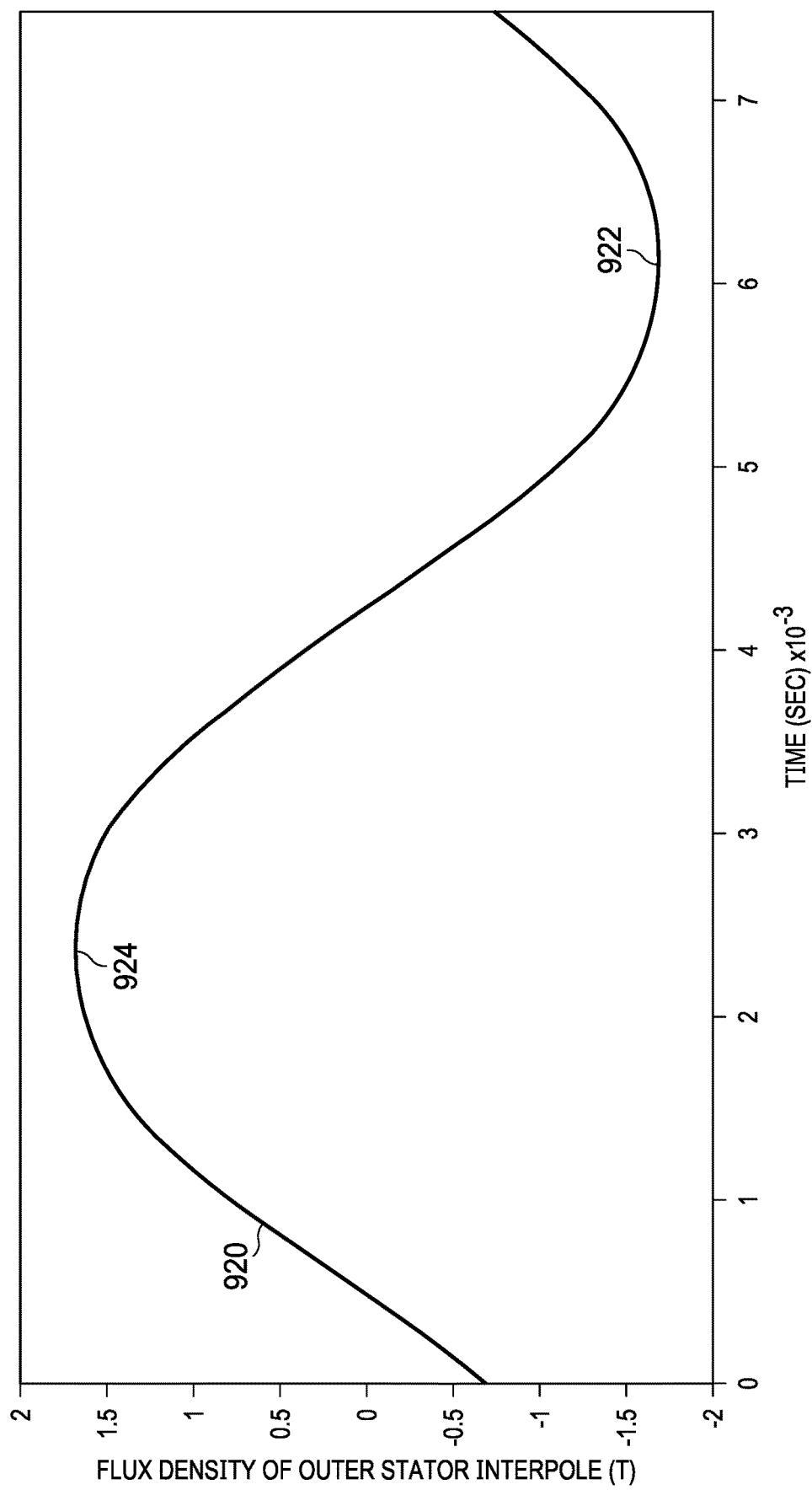
FIG. 10B is a graph of flux density versus time at an outer stator inter-pole of a machine of a preferred embodiment.

FIG. 10B shows graph 920 of flux density of an outer stator interpole versus time for a machine of the present invention with windings around every other tooth. Flux density minimum 922 of about −1.5 wb/m² and flux density maximum 924 of about 1.5 wb/m² occur at approximately 6.1 and approximately 2.3 milliseconds, respectively.

Figure 10C:
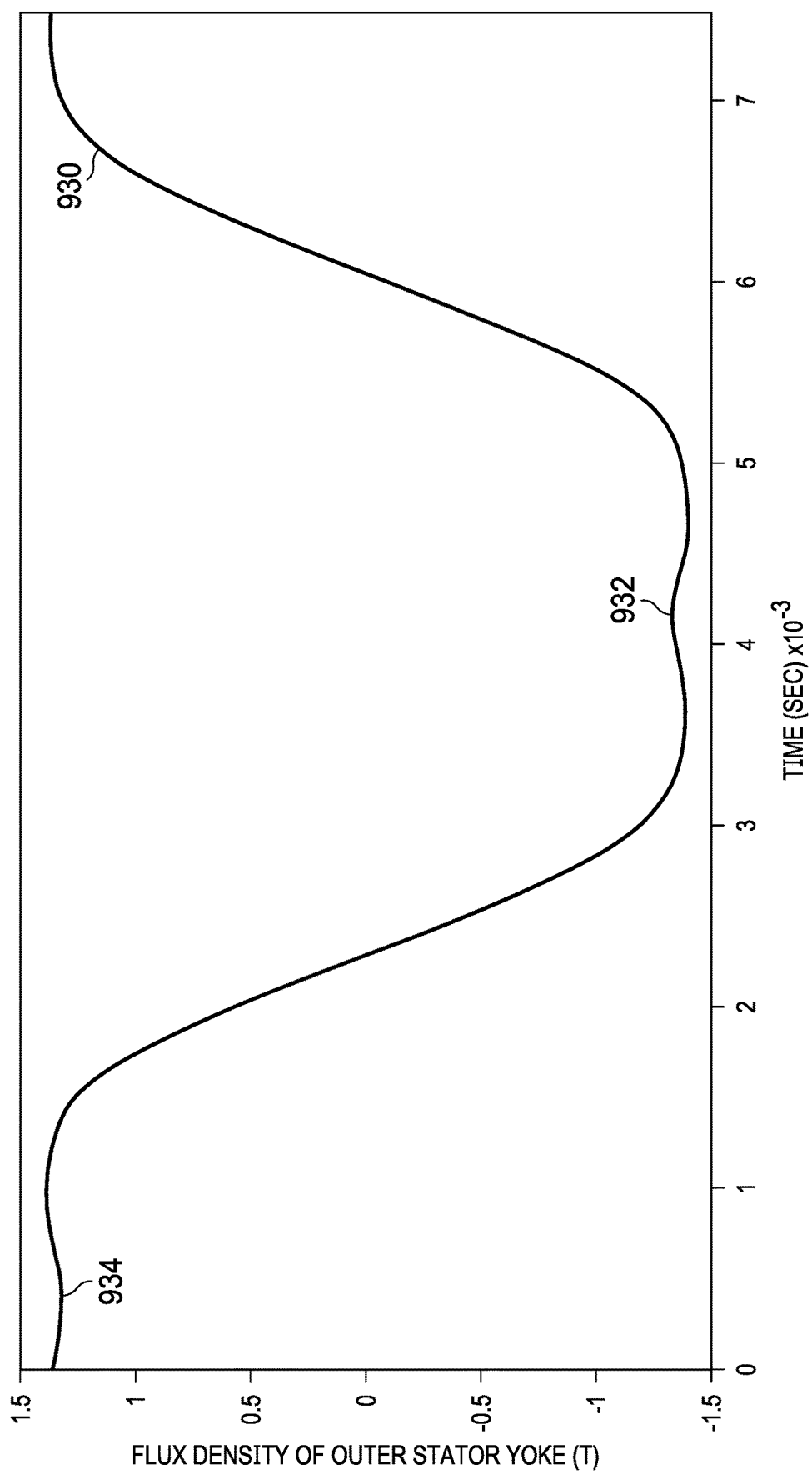
FIG. 10C is a graph of flux density versus time at outer stator yoke of a machine of a preferred embodiment.

FIG. 10C shows graph 930 of flux density of an outer stator yoke versus time for a machine of the present invention with windings around every other tooth. Flux density plateau 932 at about −1.4 wb/m² and flux density plateau 934 at about 1.4 wb/m² are centered at approximately 4.2 and approximately 0.4 milliseconds, respectively.

Figure 10D:
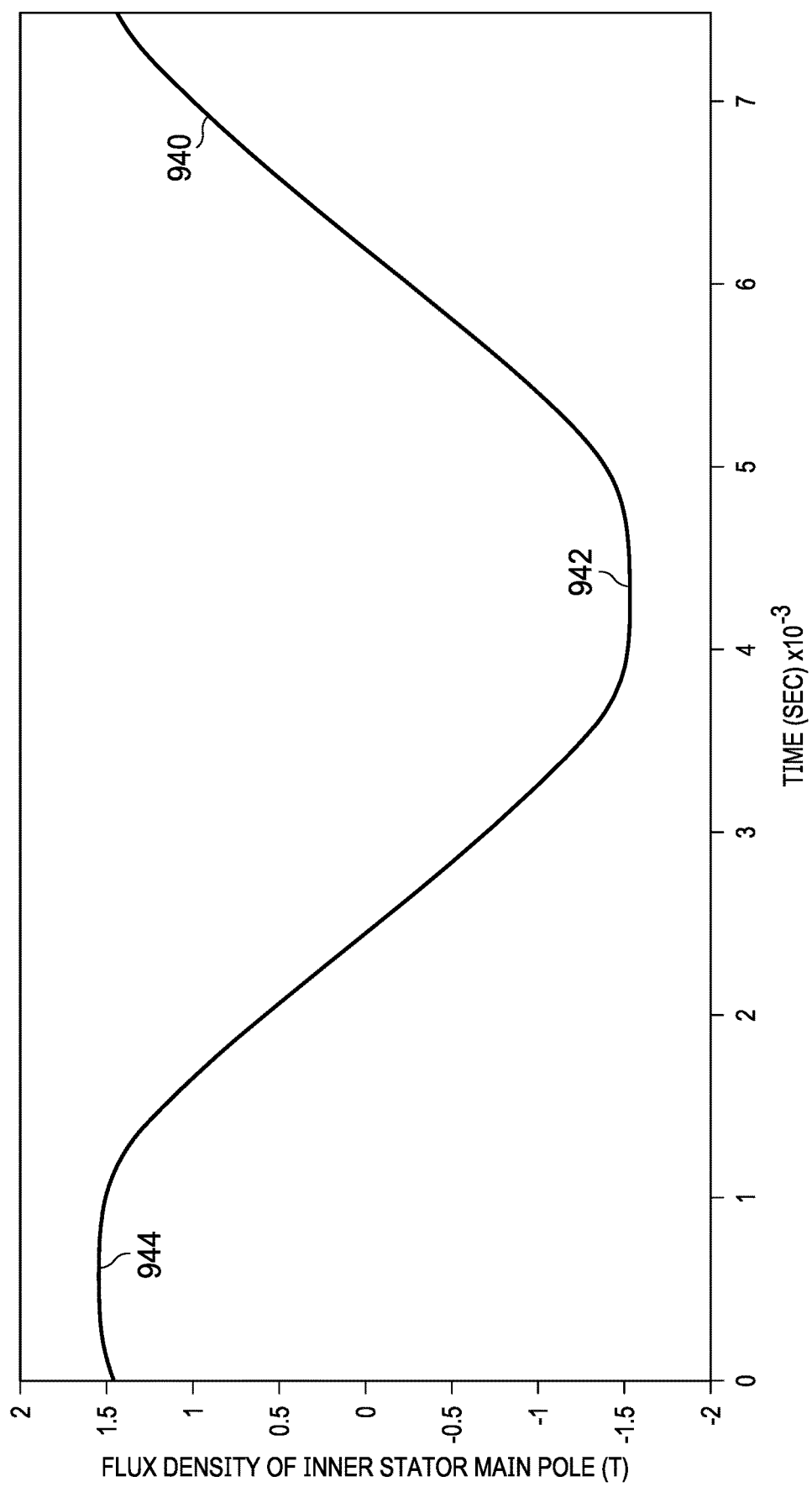
FIG. 10D is a graph of flux density versus time at an inner stator main pole of a machine of a preferred embodiment.

FIG. 10D shows graph 940 of flux density of an inner stator main pole versus time for a machine of the present invention with windings around every other tooth. Flux density minimum 942 of about −1.6 wb/m² and flux density maximum 944 at about −1.6 wb/m² occur at approximately 4.4 and approximately 0.6 milliseconds, respectively.

Figure 10E:
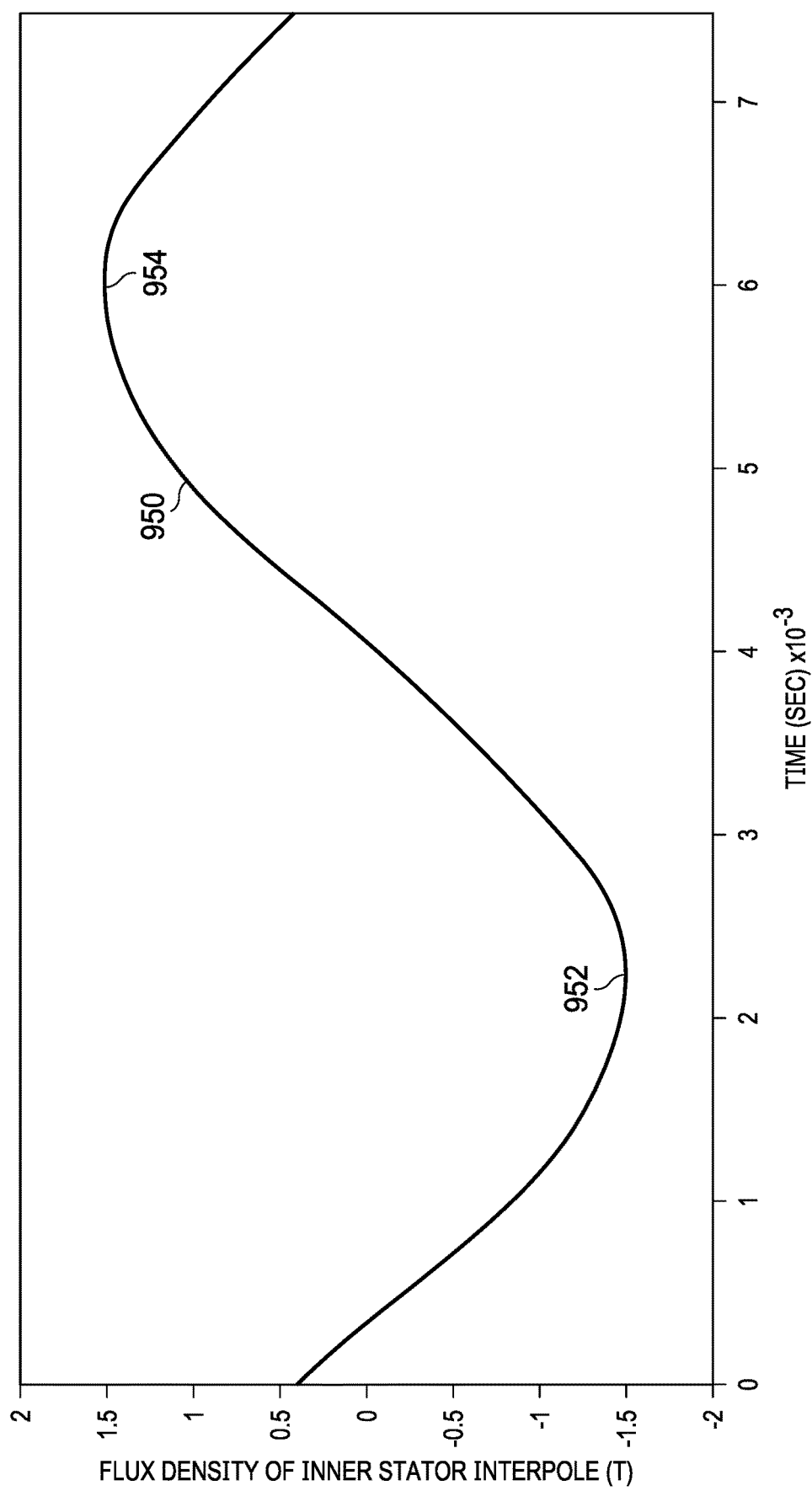
FIG. 10E is a graph of flux density versus time at an inner stator inter-pole of a machine of a preferred embodiment.

FIG. 10E shows graph 950 of flux density of an inner stator interpole versus time for a machine of the present invention with windings around every other tooth. Flux density minimum 952 of about −1.5 wb/m² and flux density maximum 954 of about −1.5 wb/m² occur at approximately 2.2 and approximately 6.0 milliseconds, respectively.

The invention claimed is:

1. An electric machine comprising:
   a frame;
   an outer stator, fixed to the frame;
   an inner stator, fixed to the frame;
   a rotor, rotationally attached to the frame, between the outer stator and the inner stator;
   a set of magnet receivers, formed in the rotor, each magnet receiver of the set of magnet receivers having a first complex topology;
   a set of magnets, positioned in the set of magnet receivers, each magnet of the set of magnets having a second complex topology;
   wherein the first complex topology further comprises:
      a curved inner flange surface;
      a curved outer flange surface; and
      a concave surface, connecting the curved inner flange surface and the curved outer flange surface; and
   wherein the concave surface is adjacent a pole of a magnet of the set of magnets;
   wherein the curved inner flange surface is defined by the equation:

$$(x-96)^2+y^2=7.21^2$$

$$88.9 \text{ mm} < x < 90.23 \text{ mm}$$

$$0.89 \text{ mm} < y < 4.55 \text{ mm}.$$

2. The electric machine of claim 1, wherein each magnet receiver of the set of magnet receivers further comprises a first bidirectional tapered flange on an inner radial side and a second bidirectional tapered flange on an outer radial side.

3. The electric machine of claim 1, wherein the set of magnets further comprises a clockwise polarity magnet adjacent a counterclockwise polarity magnet.

4. The electric machine of claim 1, wherein the set of magnets is tangentially oriented.

5. The electric machine of claim 1:
   wherein the outer stator comprises a plurality of teeth;
   wherein each tooth of the plurality of teeth has a trapezoidal flux director head.

6. The electric machine of claim 1:
   wherein the inner stator comprises a plurality of teeth;
   wherein each tooth of the plurality of teeth has a trapezoidal flux director head.

7. The electric machine of claim 1:
   wherein the outer stator further comprises a plurality of teeth;
   wherein each tooth of the plurality of teeth supports a winding.

8. The electric machine of claim 1, wherein the outer stator further comprises:
   a plurality of pole teeth;
   a plurality of interpole teeth; and
   wherein each interpole tooth, of the plurality of interpole teeth, is adjacent a pole tooth of the plurality of pole teeth;
   wherein each pole tooth, of the plurality of pole teeth, supports a winding.

9. The electric machine of claim 8 wherein each tooth of the plurality of pole teeth has a first width;
   wherein each tooth of the plurality of interpole teeth has a second width; and,
   wherein the first width is greater than the second width.

10. The electric machine of claim 1:
    wherein the inner stator further comprises a plurality of teeth;
    wherein each tooth of the plurality of teeth supports a winding.

11. The electric machine of claim 1, wherein the inner stator further comprises:
    a plurality of pole teeth;
    a plurality of interpole teeth; and
    wherein each interpole tooth of the plurality of interpole teeth is adjacent a pole tooth of the plurality of pole teeth;
    wherein each pole tooth supports a winding.

12. The electric machine of claim 1, wherein the outer stator further comprises:
    a plurality of pole teeth;
    a plurality of interpole teeth; and
    wherein each interpole tooth of the plurality of interpole teeth is adjacent a pole tooth of the plurality of pole teeth;
    wherein each pole tooth supports a winding.

13. The electric machine of claim 1:
    wherein the outer stator has a first winding density and the inner stator has a second winding density; and
    the first winding density is less than the second winding density.

14. The electric machine of claim 1, wherein:
    the outer stator is energized at a first current level;
    the inner stator is energized at a second current level; and
    the first current level is greater than the second current level.

15. The electric machine of claim 1, further comprising:
    a first air-gap between the inner stator and the rotor;
    a second air-gap between the outer stator and the rotor; and
    the first air-gap is smaller than the second air-gap.

16. The electric machine of claim 15 wherein the first air-gap is about 0.5 mm and the second air-gap is about 0.75 mm.

17. The electric machine of claim 1, wherein:
    the outer stator has a first current winding density;
    the inner stator has a second current winding density; and
    the first current winding density is greater than the second current winding density.

18. An electric machine comprising:
    a frame;
    an outer stator, fixed to the frame;
    an inner stator, fixed to the frame;
    a rotor, rotationally attached to the frame, between the outer stator and the inner stator;
    a set of magnet receivers, formed in the rotor, each magnet receiver of the set of magnet receivers having a first complex topology;
    a set of magnets, positioned in the set of magnet receivers, each magnet of the set of magnets having a second complex topology;
    wherein the first complex topology further comprises:
       a curved inner flange surface;
       a curved outer flange surface; and
       a concave surface, connecting the curved inner flange surface and the curved outer flange surface; and
    wherein the concave surface is adjacent a pole of a magnet of the set of magnets;

wherein the curved outer flange surface is defined by the equation:

$(x-97.5)^2+(y+0.44)^2=9.26^2$ 105.3 mm ≤ x < 106.5 mm 1.3 mm ≤ y < 4.74 mm.

19. An electric machine comprising:
a frame;
an outer stator, fixed to the frame;
an inner stator, fixed to the frame;
a rotor, rotationally attached to the frame, between the outer stator and the inner stator;
a set of magnet receivers, formed in the rotor, each magnet receiver of the set of magnet receivers having a first complex topology;
a set of magnets, positioned in the set of magnet receivers, each magnet of the set of magnets having a second complex topology;
wherein the first complex topology further comprises:
    a curved inner flange surface;
    a curved outer flange surface; and
    a concave surface, connecting the curved inner flange surface and the curved outer flange surface; and
wherein the concave surface is adjacent a pole of a magnet of the set of magnets;
wherein the concave surface is defined by the equation:

$$\frac{(x-98)^2}{7.5^2}+\frac{(y-5)^2}{0.975^2}=1$$

90.23 mm < x < 105.3 mm 4.55 mm < y < 4.74 mm.

20. An electric machine comprising:
a frame;
an outer stator, fixed to the frame;
an inner stator, fixed to the frame;
a rotor, rotationally attached to the frame, between the outer stator and the inner stator;
a set of magnet receivers, formed in the rotor, each magnet receiver of the set of magnet receivers having a first complex topology;
a set of magnets, positioned in the set of magnet receivers, each magnet of the set of magnets having a second complex topology; and
wherein the second complex topology further comprises:
    an inner radius;
    an outer radius; and
    a convex surface;
wherein the convex surface is adjacent a magnet receiver of the set of magnet receivers;
wherein the outer radius is defined by the equation:

$x^2+y^2=105.32$ 105.2 mm ≤ x < 105.32 mm 0 mm ≤ y < 4.74 mm.

21. An electric machine comprising:
a frame;
an outer stator, fixed to the frame;
an inner stator, fixed to the frame;
a rotor, rotationally attached to the frame, between the outer stator and the inner stator;
a set of magnet receivers, formed in the rotor, each magnet receiver of the set of magnet receivers having a first complex topology;
a set of magnets, positioned in the set of magnet receivers, each magnet of the set of magnets having a second complex topology;
wherein the second complex topology further comprises:
    an inner radius;
    an outer radius; and
    a convex surface;
wherein the convex surface is adjacent a magnet receiver of the set of magnet receivers;
wherein the inner radius is defined by the equation:

$x^2+y^2=90.232$ 90.13 mm ≤ x < 90.23 mm 0 mm ≤ y < 4.55 mm.

22. An electric machine comprising:
a frame;
an outer stator, fixed to the frame;
an inner stator, fixed to the frame;
a rotor, rotationally attached to the frame, between the outer stator and the inner stator;
a set of magnet receivers, formed in the rotor, each magnet receiver of the set of magnet receivers having a first complex topology;
a set of magnets, positioned in the set of magnet receivers, each magnet of the set of magnets having a second complex topology;
wherein the second complex topology further comprises:
    an inner radius;
    an outer radius; and
    a convex surface;
wherein the convex surface is adjacent a magnet receiver of the set of magnet receivers;
wherein the convex surface is defined by the equation:

$$\frac{(x-98)^2}{7.5^2}+\frac{(y-5)^2}{0.975^2}=1$$

90.23 mm < x < 105.3 mm 4.55 mm < y < 4.74 mm.

* * * * *